(12) United States Patent
Yang et al.

(10) Patent No.: US 10,417,994 B2
(45) Date of Patent: Sep. 17, 2019

(54) RGB FORMAT ADJUSTMENT AND RECONSTRUCTION METHOD AND CIRCUIT FOR DEPTH FRAME PACKING AND DEPACKING

(71) Applicant: NATIONAL CHENG KUNG UNIVERSITY, Tainan (TW)

(72) Inventors: Jar-Ferr Yang, Tainan (TW); Kuan-Cheng Chen, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 39 days.

(21) Appl. No.: 15/908,245

(22) Filed: Feb. 28, 2018

(65) Prior Publication Data

US 2019/0114992 A1    Apr. 18, 2019

(30) Foreign Application Priority Data

Oct. 16, 2017    (TW) .............................. 106135377 A

(51) Int. Cl.
*G09G 5/04*    (2006.01)
*H04N 9/67*    (2006.01)

(52) U.S. Cl.
CPC ................. *G09G 5/04* (2013.01); *H04N 9/67* (2013.01); *G09G 2300/0452* (2013.01); *G09G 2340/06* (2013.01)

(58) Field of Classification Search
CPC ..... G09G 5/04; G09G 2300/0452; H04N 9/67
See application file for complete search history.

(56) References Cited

U.S. PATENT DOCUMENTS

2006/0176313 A1*  8/2006  Xu ............................ H04N 9/67
                                                    345/603
2011/0279493 A1* 11/2011  Phan ......................... G09G 3/20
                                                    345/694

OTHER PUBLICATIONS

Jar-Ferr Yang, et al., Centralized Texture Depth Packing SEI Message for HEVC and AVC, Joint Collaborative Team on Video Coding (JCT-VC), 29th Meeting, National Cheng Kung University, Taiwan, Oct. 19-24, 2017, pp. 1-20, JCTVC-AC0027, Macao,CN.
Jar-Ferr Yang, et al., Centralized Texture Depth Packing SEI Message for HEVC and AVC, Joint Collaborative Team on Video Coding (JCT-VC)—30th Meeting, National Cheng Kung University, Taiwan, Jan. 20-26, 2018, pp. 1-16, JCTVC-AD0022, Gwangju, KR.

* cited by examiner

*Primary Examiner* — Grace Q Li
(74) *Attorney, Agent, or Firm* — Muncy, Geissler, Olds & Lowe, P.C.

(57) ABSTRACT

An RGB format adjustment method includes: obtaining subpixel values having interleaved positions from four pixels in unadjusted RGB format; obtaining subpixel values of a first pixel in an adjusted RGB format according to the obtained subpixel values, wherein the R subpixel value of the adjusted first pixel is equal to an R subpixel value of the unadjusted first pixel, the G subpixel value of the adjusted first pixel is equal to an R subpixel value of a fourth pixel in the unadjusted RGB format, and the B subpixel value of the adjusted first pixel is equal to a B subpixel value of the unadjusted first pixel; and obtaining R subpixel values, G subpixel values and B subpixel values of a second pixel, a third pixel and the fourth pixel according to the obtained subpixel values and the obtained R, G and B subpixel values of the adjusted first pixel.

12 Claims, 14 Drawing Sheets

| obtain an R subpixel value, a G subpixel value and a B subpixel value of the first pixel of the unconstructed RGB format, a B subpixel value of the second pixel of the unconstructed RGB format, an R subpixel value, a G subpixel value and a B subpixel value of the third pixel of the nconstructed RGB format, and a B subpixel value of the fourth pixel of the unconstructed RGB format | X01 |

↓

| obtain eight subpixel values in a reconstructed RGB format according to the obtained R, G and B subpixel values of the first pixel of the unconstructed RGB format, the obtained B subpixel value of the second pixel of the unconstructed RGB format, the obtained R, G and B subpixel values of the third pixel of the unconstructed RGB format, and the obtained B subpixel value of the fourth pixel of the unconstructed RGB format, wherein the R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the B subpixel value of the second pixel in the reconstructed RGB format is equal to the B subpixel value of the second pixel in the unreconstructed RGB format, the R subpixel value of the third pixel in the reconstructed RGB format is equal to the R subpixel value of the third pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the B subpixel value of the third pixel in the unreconstructed RGB format, and the B subpixel value of the fourth pixel in the reconstructed RGB format is equal to the B subpixel value of the fourth pixel in the unreconstructed RGB format | X02 |

FIG. 10

RGB FORMAT ADJUSTMENT AND RECONSTRUCTION METHOD AND CIRCUIT FOR DEPTH FRAME PACKING AND DEPACKING

CROSS REFERENCE TO RELATED APPLICATIONS

This Non-provisional application claims priority under 35 U.S.C. § 119(a) on Patent Application No(s). 106135377 filed in Taiwan, Republic of China on Oct. 16, 2017, the entire contents of which are hereby incorporated by reference.

BACKGROUND

Technology Field

The present disclosure relates to an RGB format adjustment and reconstruction method and circuit for depth frame packing and depacking.

Description of Related Art

Most human visible colors can be presented by mixing red, green and blue (R, G, B). However, the human visual system is more sensitive to luminance and less sensitive to chrominance. Moreover, the vector space constructed by the three primary colors cannot process the image intensity (brightness), such as softening, sharpening, and the likes. Besides, the RGB format image data usually occupies a larger bandwidth in transmission and larger memory space in storage. Therefore, it is necessary to transform the RGB format image data into YUV format image data to achieve high efficient image transmission.

In the conventional art, the video or image compression system can convert the adjacent four pixels of the RGB sub-pixels into adjacent four pixels (also known as YUV 444 format) of the YUV sub-pixels before data transmission, and then the receiving end can convert the YUV format image data back to the RGB format image data.

FIGS. 1A and 1B show the conversions of the depth vertical pixels and the depth horizontal pixels in the conventional H.265 video compression system. According to what is shown in FIGS. 1A and 1B and the matrix and inverse matrix equations (1) and (2) as shown in the following Tables 1 and 2, excluding the calculated error, the conversion and inverse conversion of the image data between the RGB format and the YUV 444 format does not cause distortion.

TABLE 1 conversion from RGB to YUV $$\begin{bmatrix} Y_i \\ U_i \\ V_i \end{bmatrix} = \begin{bmatrix} 0.2568 & 0.5041 & 0.0979 \\ -0.1482 & -0.2910 & 0.4392 \\ 0.4392 & -0.3678 & -0.0714 \end{bmatrix} \begin{bmatrix} R_i \\ G_i \\ B_i \end{bmatrix} + \begin{bmatrix} 16 \\ 128 \\ 128 \end{bmatrix} \quad (1)$$

TABLE 2 inverse conversion from YUV to RGB $$\begin{bmatrix} R_i \\ G_i \\ B_i \end{bmatrix} = \begin{bmatrix} 1.1644 & 0.0001 & 1.5960 \\ 1.1644 & -0.3917 & -0.8130 \\ 1.1644 & 2.0173 & 0.0001 \end{bmatrix} \begin{bmatrix} Y_i - 16 \\ U_i - 128 \\ V_i - 128 \end{bmatrix} \quad (2)$$

However, in order to achieve high efficient video transmission, in some embodiments, the video or image compression system preserves the four luminance values (Y) of the four pixels of the YUV format, and the four chrominance values (U, V) are processed by subsampling so as to leave only the U, V chrominance values of two pixels (also known as YUV 422 format), or the U, V chrominance values of one pixel (also known as YUV 420 format). Thus, the transmission of image data of YUV422 or 420 format can occupy less bandwidth in transmission and less memory space in storage, thereby achieving high efficient video compression and transmission.

FIGS. 2A and 2B show the YUV444 format, YUV422 format, and YUV420 format of the depth vertical and horizontal packages, respectively. The black UV Chroma values are indicated in the two illustrations has been routed by the different sampling. Because the YUV 420 format consumes the least amount of bandwidth and memory, it is the most commonly used format for video or image compression systems.

When the receiving end of the image decompression system receives the YUV420 (or YUV 422) format image data, the lacked U, V chrominance values are filled with the remained neighboring U, V chrominance values so as to obtain the approximate YUV444 format image data, which are then converted to the RGB format image data. For example, in the YUV 420 format, the decompression system fills the U chrominance values ($U_2$, $U_3$, $U_4$) of the second pixel, the third pixel, and the fourth pixel, respectively, with the U chrominance value ($U_1$) of the first pixel, and fills the V chrominance values ($V_2$, $V_3$, $V_4$) of the second pixel, the third pixel, and the fourth pixel, respectively, with the V chrominance value ($V_1$) of the first pixel. Then, the four pixels in the YUV format are converted to RGB format according to the above-mentioned equation (2). In the above case, only the $R_1$, $G_1$ and $B_1$ can be completely recovered, and the other R, G and B values will have distortions of different levels due to the filled $U_1$ and $V_1$.

In the YUV 422 format, the decompression system fills $U_2$ and $U_4$ with $U_1$ and $U_3$, respectively, and fills $V_2$ and $V_4$ with $V_1$ and $V_3$, respectively. Then, the four pixels in the YUV format are converted to RGB format according to the above-mentioned equation (2). In the above case, only the $R_1$, $G_1$, $B_1$, $R_3$, $G_3$ and $B_3$ can be completely recovered. The $R_2$, $G_2$ and $B_2$ are filled with $U_1$ and $V_1$, so the correction of $R_2$, $G_2$ and $B_2$ cannot be guaranteed. The $R_4$, $G_4$ and $B_4$ are filled with $U_3$ and $V_3$, so the correction of $R_4$, $G_4$ and $B_4$ cannot be guaranteed.

Since the RGB format expresses the depth frame values of relative positions, once the depth frame packing utilizes the conversion between RGB format and YUV format in the compression and decompression system and the coding and decoding system utilizes the YUV 420 format or YUV 422 format, the filled U and V values are different, and the incontrollable depth frame error may occur around the area with larger depth gap while converting back to the RGB format.

The above-mentioned conversion and inverse conversion method for processing the RGB format and YUV format image data in the conventional art have been used by the industry for a long time. Although the parameter values in tables 1 and 2 may have a slight change, the conversion and inverse conversion are carried out by the matrix with the three variables (R, B or Y, U, V), and are only focused on the transmission efficiency with regardless other factors.

SUMMARY

An objective of this disclosure is to provide an RGB format adjustment and reconstruction method and circuit for depth frame packing and depacking that can be applied to the conventional video compression and decompression system.

When the RGB format adjustment and reconstruction program for depth frame packing and depacking is applied in the conversion from RGB format to YUV format and reverse conversion from YUV format to RGB format, a better RGB conversion can be provided to obtain a better recovered depth pixel values, so that the distortion around the area with larger (or dramatic) depth gap can be improved.

The present disclosure provides an RGB format adjustment method for depth frame packing and depacking. An RGB format comprises an R subpixel, a G subpixel and a B subpixel, and the depth frame in an unadjusted RGB format at least comprises four pixels. R subpixels, G subpixels and B subpixels of the four pixels are arranged in vertical or in horizontal. The four pixels include a first pixel, a second pixel, a third pixel and a fourth pixel. The first pixel is arranged neighboring the second pixel and the third pixel, and the fourth pixel is arranged neighboring the second pixel and the third pixel. The method includes: obtaining two R subpixel values, two G subpixel values and two B subpixel values having interleaved positions from the four pixels in the unadjusted RGB format; obtaining an R subpixel value, a G subpixel value and a B subpixel value of a first pixel in an adjusted RGB format according to the obtained R, G and B subpixel values, wherein the R subpixel value of the first pixel in the adjusted RGB format is equal to an R subpixel value of the first pixel in the unadjusted RGB format, the G subpixel value of the first pixel in the adjusted RGB format is equal to an R subpixel value of the fourth pixel in the unadjusted RGB format, and the B subpixel value of the first pixel in the adjusted RGB format is equal to a B subpixel value of the first pixel in the unadjusted RGB format; and obtaining R subpixel values, G subpixel values and B subpixel values of a second pixel in the adjusted RGB format, a third pixel in the adjusted RGB format and the fourth pixel in the adjusted RGB format according to the obtained R, G and B subpixel values and the obtained R, G and B subpixel values of the first pixel in the adjusted RGB format.

The present disclosure also provides a circuit applied to perform the RGB format adjustment method for the depth frame packing and depacking. The circuit includes a pixel retrieving unit and a pixel converting unit. The pixel retrieving unit obtains two R subpixel values, two G subpixel values and two B subpixel values having interleaved positions from the four pixels in the unadjusted RGB format. The pixel converting unit obtains the R subpixel value, the G subpixel value and the B subpixel value of the first pixel in the adjusted RGB format according to the two R subpixel values, the two G subpixel values, and the two B subpixel values obtained by the pixel retrieving unit. The R subpixel value of the first pixel in the adjusted RGB format is equal to the R subpixel value of the first pixel in the unadjusted RGB format, the G subpixel value of the first pixel in the adjusted RGB format is equal to the R subpixel value of the fourth pixel in the unadjusted RGB format, and the B subpixel value of the first pixel in the adjusted RGB format is equal to the B subpixel value of the first pixel in the unadjusted RGB format. The pixel converting unit further obtains the R subpixel values, the G subpixel values and the B subpixel values of the second pixel in the adjusted RGB format, the third pixel in the adjusted RGB format and the fourth pixel in the adjusted RGB format according to the two R subpixel values, the two G subpixel values and the two B subpixel values obtained by the pixel retrieving unit, and the obtained R, G and B subpixel values of the first pixel in the adjusted RGB format.

The present disclosure provides an RGB format adjustment method for depth frame packing and depacking. An RGB format comprises an R subpixel, a G subpixel and a B subpixel, and the depth frame in an unadjusted RGB format at least comprises four pixels. R subpixels, G subpixels and B subpixels of the four pixels are arranged in vertical. The four pixels include a first pixel, a second pixel, a third pixel and a fourth pixel. The first pixel is arranged neighboring the second pixel and the third pixel, and the fourth pixel is arranged neighboring the second pixel and the third pixel. The method includes: obtaining subpixel values of eight selected positions from the four pixels in the unadjusted RGB format; obtaining an R subpixel value, a G subpixel value and a B subpixel value of a first pixel in an adjusted RGB format and an R subpixel value, a G subpixel value and a B subpixel value of a third pixel in an adjusted RGB format according to the obtained subpixel values of the eight selected positions, wherein the R subpixel value of the first pixel in the adjusted RGB format is equal to an R subpixel value of the first pixel in the unadjusted RGB format, the G subpixel value of the first pixel in the adjusted RGB format is equal to a G subpixel value of the second pixel in the unadjusted RGB format, the B subpixel value of the first pixel in the adjusted RGB format is equal to a B subpixel value of the first pixel in the unadjusted RGB format, the R subpixel value of the third pixel in the adjusted RGB format is equal to an R subpixel value of the fourth pixel in the unadjusted RGB format, the G subpixel value of the third pixel in the adjusted RGB format is equal to a G subpixel value of the third pixel in the unadjusted RGB format, and the B subpixel value of the third pixel in the adjusted RGB format is equal to a B subpixel value of the third pixel in the unadjusted RGB format; and obtaining R subpixel values, G subpixel values and B subpixel values of the second pixel in the adjusted RGB format and the fourth pixel in the adjusted RGB format according to the subpixel values of the obtained eight selected positions and the obtained R, G and B subpixel values of the first pixel in the adjusted RGB format and the third pixel in the adjusted RGB format.

The present disclosure also provides a circuit applied to perform the RGB format adjustment method for the depth frame packing and depacking. The circuit includes a pixel retrieving unit and a pixel converting unit. The pixel retrieving unit obtains subpixel values of eight selected positions from the four pixels in the unadjusted RGB format. The pixel converting unit obtains an R subpixel value, a G subpixel value and a B subpixel value of a first pixel in an adjusted RGB format and an R subpixel value, a G subpixel value and a B subpixel value of a third pixel in an adjusted RGB format according to the obtained subpixel values of the eight selected positions. The pixel converting unit further obtains R subpixel values, G subpixel values and B subpixel values of the second pixel in the adjusted RGB format and the fourth pixel in the adjusted RGB format according to the subpixel values of the obtained eight selected positions and the obtained R, G and B subpixel values of the first pixel in the adjusted RGB format and the third pixel in the adjusted RGB format. The R subpixel value of the first pixel in the adjusted RGB format is equal to an R subpixel value of the first pixel in the unadjusted RGB format, the G subpixel value of the first pixel in the adjusted RGB format is equal to a G subpixel value of the second pixel in the unadjusted RGB format, the B subpixel value of the first pixel in the adjusted RGB format is equal to a B subpixel value of the first pixel in the unadjusted RGB format, the R subpixel value of the third pixel in the adjusted RGB format is equal to an R subpixel value of the fourth pixel in the unadjusted RGB format, the G subpixel value of the third pixel in the adjusted RGB format is equal to a G subpixel value of the third pixel in the unadjusted RGB format, and the B subpixel value of the third pixel in the adjusted RGB format is equal to a B subpixel value of the third pixel in the unadjusted RGB format.

The present disclosure provides an RGB format adjustment method for depth frame packing and depacking. An RGB format comprises an R subpixel, a G subpixel and a B subpixel, and the depth frame in an unadjusted RGB format at least comprises four pixels. R subpixels, G subpixels and B subpixels of the four pixels are arranged in vertical. The four pixels include a first pixel, a second pixel, a third pixel and a fourth pixel. The first pixel is arranged neighboring the second pixel and the third pixel, and the fourth pixel is arranged neighboring the second pixel and the third pixel. The method includes: obtaining subpixel values of eight selected positions from the four pixels in the unadjusted RGB format; obtaining an R subpixel value, a G subpixel value and a B subpixel value of the first pixel in an adjusted RGB format and an R subpixel value, a G subpixel value and a B subpixel value of the third pixel in an adjusted RGB format according to the obtained subpixel values of the eight selected positions, wherein the R subpixel value of the first pixel in the adjusted RGB format is equal to an R subpixel value of the first pixel in the unadjusted RGB format, the G subpixel value of the first pixel in the adjusted RGB format is equal to a G subpixel value of the second pixel in the unadjusted RGB format, the B subpixel value of the first pixel in the adjusted RGB format is equal to a B subpixel value of the first pixel in the unadjusted RGB format, the R subpixel value of the third pixel in the adjusted RGB format is equal to an R subpixel value of the third pixel in the unadjusted RGB format, the G subpixel value of the third pixel in the adjusted RGB format is equal to a G subpixel value of the third pixel in the unadjusted RGB format, and the B subpixel value of the third pixel in the adjusted RGB format is equal to an R subpixel value of the fourth pixel in the unadjusted RGB format; and obtaining R subpixel values, G subpixel values and B subpixel values of the second pixel in the adjusted RGB format and the fourth pixel in the adjusted RGB format according to the subpixel values of the obtained eight selected positions and the obtained R, G and B subpixel values of the first pixel in the adjusted RGB format and the third pixel in the adjusted RGB format.

The present disclosure also provides a circuit applied to perform the RGB format adjustment method for the depth frame packing and depacking. The circuit includes a pixel retrieving unit and a pixel converting unit. The pixel retrieving unit obtains subpixel values of eight selected positions from the four pixels in the unadjusted RGB format. The pixel converting unit obtains an R subpixel value, a G subpixel value and a B subpixel value of the first pixel in an adjusted RGB format and an R subpixel value, a G subpixel value and a B subpixel value of the third pixel in an adjusted RGB format according to the obtained subpixel values of the eight selected positions. The pixel converting unit further obtains R subpixel values, G subpixel values and B subpixel values of the second pixel in the adjusted RGB format and the fourth pixel in the adjusted RGB format according to the subpixel values of the obtained eight selected positions and the obtained R, G and B subpixel values of the first pixel in the adjusted RGB format and the third pixel in the adjusted RGB format. The R subpixel value of the first pixel in the adjusted RGB format is equal to an R subpixel value of the first pixel in the unadjusted RGB format, the G subpixel value of the first pixel in the adjusted RGB format is equal to a G subpixel value of the second pixel in the unadjusted RGB format, the B subpixel value of the first pixel in the adjusted RGB format is equal to a B subpixel value of the first pixel in the unadjusted RGB format, the R subpixel value of the third pixel in the adjusted RGB format is equal to an R subpixel value of the third pixel in the unadjusted RGB format, the G subpixel value of the third pixel in the adjusted RGB format is equal to a G subpixel value of the third pixel in the unadjusted RGB format, and the B subpixel value of the third pixel in the adjusted RGB format is equal to an R subpixel value of the fourth pixel in the unadjusted RGB format.

The present disclosure provides an RGB format reconstruction method for depth frame packing and depacking. An RGB format includes an R subpixel, a G subpixel and a B subpixel, and the depth frame in an unreconstructed RGB format at least includes four pixels. R subpixels, G subpixels and B subpixels of the four pixels are arranged in vertical or in horizontal. The four pixels include a first pixel, a second pixel, a third pixel and a fourth pixel. The first pixel is arranged neighboring the second pixel and the third pixel, and the fourth pixel is arranged neighboring the second pixel and the third pixel. The method includes: obtaining an R subpixel value, a G subpixel value and a B subpixel value of the first pixel of the unconstructed RGB format, a G subpixel value of the third pixel of the unconstructed RGB format, and a B subpixel value of the fourth pixel of the unconstructed RGB format; and obtaining six subpixel values having interleaved positions in a reconstructed RGB format according to the obtained R, G and B subpixel values of the first pixel of the unconstructed RGB format, the G subpixel value of the third pixel of the unconstructed RGB format, and the B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the G subpixel value of the first pixel in the unreconstructed RGB format, and the B subpixel value of the fourth pixel in the reconstructed RGB format is equal to the B subpixel value of the fourth pixel in the unreconstructed RGB format.

The present disclosure also provides a circuit applied to perform the RGB format reconstruction method for the depth frame packing and depacking. The circuit includes a pixel retrieving unit and a pixel converting unit. The pixel retrieving unit obtains the R subpixel value, the G subpixel value and the B subpixel value of the first pixel of the unconstructed RGB format, the G subpixel value of the third pixel of the unconstructed RGB format, and the B subpixel value of the fourth pixel of the unconstructed RGB format. The pixel converting unit obtains the six subpixel values having interleaved positions in the reconstructed RGB format according to the obtained R, G and B subpixel values of the first pixel of the unconstructed RGB format, the G subpixel value of the third pixel of the unconstructed RGB format, and the B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the G subpixel value of the first pixel in the unreconstructed RGB format, and the B subpixel value of the fourth pixel in the reconstructed RGB format is equal to the B subpixel value of the fourth pixel in the unreconstructed RGB format.

The present disclosure provides an RGB format reconstruction method for depth frame packing and depacking. An RGB format includes an R subpixel, a G subpixel and a B subpixel, and the depth frame in an unreconstructed RGB format at least includes four pixels. R subpixels, G subpixels and B subpixels of the four pixels are arranged in vertical or in horizontal. The four pixels include a first pixel, a second pixel, a third pixel and a fourth pixel. The first pixel is arranged neighboring the second pixel and the third pixel, and the fourth pixel is arranged neighboring the second pixel and the third pixel. The method includes: obtaining an R subpixel value, a G subpixel value and a B subpixel value of the first pixel of the unconstructed RGB format, an R subpixel value of the second pixel of the unconstructed RGB format, an R subpixel value, a G subpixel value and a B subpixel value of the third pixel of the unconstructed RGB format, and a B subpixel value of the fourth pixel of the unconstructed RGB format; and obtaining eight subpixel values in a reconstructed RGB format according to the obtained R, G and B subpixel values of the first pixel of the unconstructed RGB format, the obtained R subpixel value of the second pixel of the unconstructed RGB format, the obtained R, G and B subpixel values of the third pixel of the unconstructed RGB format, and the obtained B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the R subpixel value of the second pixel in the reconstructed RGB format is equal to the R subpixel value of the second pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the B subpixel value of the third pixel in the reconstructed RGB format is equal to the B subpixel value of the third pixel in the unreconstructed RGB format, the R subpixel value of the fourth pixel in the reconstructed RGB format is equal to the R subpixel value of the third pixel in the unreconstructed RGB format, and the B subpixel value of the fourth pixel in the reconstructed RGB format is equal to the B subpixel value of the fourth pixel in the unreconstructed RGB format.

The present disclosure also provides a circuit applied to perform the RGB format reconstruction method for the depth frame packing and depacking. The circuit includes a pixel retrieving unit and a pixel converting unit. The pixel retrieving unit obtains an R subpixel value, a G subpixel value and a B subpixel value of the first pixel of the unconstructed RGB format, an R subpixel value of the second pixel of the unconstructed RGB format, an R subpixel value, a G subpixel value and a B subpixel value of the third pixel of the unconstructed RGB format, and a B subpixel value of the fourth pixel of the unconstructed RGB format. The pixel converting unit obtains eight subpixel values in a reconstructed RGB format according to the obtained R, G and B subpixel values of the first pixel of the unconstructed RGB format, the obtained R subpixel value of the second pixel of the unconstructed RGB format, the obtained R, G and B subpixel values of the third pixel of the unconstructed RGB format, and the obtained B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the R subpixel value of the second pixel in the reconstructed RGB format is equal to the R subpixel value of the second pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the B subpixel value of the third pixel in the reconstructed RGB format is equal to the B subpixel value of the third pixel in the unreconstructed RGB format, the R subpixel value of the fourth pixel in the reconstructed RGB format is equal to the R subpixel value of the third pixel in the unreconstructed RGB format, and the B subpixel value of the fourth pixel in the reconstructed RGB format is equal to the B subpixel value of the fourth pixel in the unreconstructed RGB format.

The present disclosure provides an RGB format reconstruction method for depth frame packing and depacking. An RGB format includes an R subpixel, a G subpixel and a B subpixel, and the depth frame in an unreconstructed RGB format at least includes four pixels. R subpixels, G subpixels and B subpixels of the four pixels are arranged in vertical or in horizontal. The four pixels include a first pixel, a second pixel, a third pixel and a fourth pixel. The first pixel is arranged neighboring the second pixel and the third pixel, and the fourth pixel is arranged neighboring the second pixel and the third pixel. The method includes: obtaining an R subpixel value, a G subpixel value and a B subpixel value of the first pixel of the unconstructed RGB format, a B subpixel value of the second pixel of the unconstructed RGB format, an R subpixel value, a G subpixel value and a B subpixel value of the third pixel of the unconstructed RGB format, and a B subpixel value of the fourth pixel of the unconstructed RGB format; and obtaining eight subpixel values in a reconstructed RGB format according to the obtained R, G and B subpixel values of the first pixel of the unconstructed RGB format, the obtained B subpixel value of the second pixel of the unconstructed RGB format, the obtained R, G and B subpixel values of the third pixel of the unconstructed RGB format, and the obtained B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the B subpixel value of the second pixel in the reconstructed RGB format is equal to the B subpixel value of the second pixel in the unreconstructed RGB format, the R subpixel value of the third pixel in the reconstructed RGB format is equal to the R subpixel value of the third pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the G subpixel value of the third pixel in the unreconstructed RGB format, and the B subpixel value of the fourth pixel in the reconstructed RGB format is equal to the B subpixel value of the fourth pixel in the unreconstructed RGB format.

The present disclosure also provides a circuit applied to perform the RGB format reconstruction method for the depth frame packing and depacking. The circuit includes a pixel retrieving unit and a pixel converting unit. The pixel retrieving unit obtains an R subpixel value, a G subpixel value and a B subpixel value of the first pixel of the unconstructed RGB format, a B subpixel value of the second pixel of the unconstructed RGB format, an R subpixel value, a G subpixel value and a B subpixel value of the third pixel of the unconstructed RGB format, and a B subpixel value of the fourth pixel of the unconstructed RGB format. The pixel converting unit obtains eight subpixel values in a reconstructed RGB format according to the obtained R, G and B subpixel values of the first pixel of the unconstructed RGB format, the obtained B subpixel value of the second pixel of the unconstructed RGB format, the obtained R, G and B subpixel values of the third pixel of the unconstructed RGB format, and the obtained B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the B subpixel value of the second pixel in the reconstructed RGB format is equal to the B subpixel value of the second pixel in the unreconstructed RGB format, the R subpixel value of the third pixel in the reconstructed RGB format is equal to the R subpixel value of the third pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the B subpixel value of the third pixel in the unreconstructed RGB format, and the B subpixel value of the fourth pixel in the reconstructed RGB format is equal to the B subpixel value of the fourth pixel in the unreconstructed RGB format.

As mentioned above, in the RGB format adjustment and reconstruction method and circuit for depth frame packing and depacking of this disclosure, the procedures of the conversion from RGB format to YUV format and the revised conversion from YUV format to RGB format in the conventional video compression system are not changed. Moreover, in the RGB format adjustment and reconstruction method and circuit for depth frame packing and depacking of this disclosure, a better RGB conversion can be obtained without directly contacting or adjusting YUV values so as to recover a better original depth pixel values, thereby improving the distortion around the area having large (or dramatic) depth gap.

BRIEF DESCRIPTION OF THE DRAWINGS

The disclosure will become more fully understood from the detailed description and accompanying drawings, which are given for illustration only, and thus are not limitative of the present disclosure, and wherein:

FIGS. 9 and 10 are flow charts showing different RGB format reconstruction methods for depth frame packing and depacking according to the embodiment of the disclosure.

DETAILED DESCRIPTION OF THE DISCLOSURE

The present disclosure will be apparent from the following detailed description, which proceeds with reference to the accompanying drawings, wherein the same references relate to the same elements.

The RGB format adjustment and reconstruction method and circuit of the present disclosure are applied to the packing and unpacking techniques of the 3D depth frame system. In addition, the RGB format adjustment and reconstruction method and circuit of the present disclosure can be applied to the compression and transmission of gray scale image signals. This disclosure can be applied to the above-mentioned high performance video compression and decompression system, and be preferably applied to the packing and unpacking techniques of the 3D image system disclosed by the inventors in U.S. patent application Ser. Nos. 14/504,901, 14/504,936, 14/505,117 and 14/505,153, wherein each of the above references is incorporated herein in its entirety by reference.

In the conventional high performance video compression and decompression system, the image data are transformed from the RGB format to the YUV422 format or the YUV 420 format, and then transmitted to the receiving end. After the receiving end receives the image data in YUV422 or YUV 420 format, the image data are transformed from the YUV422 or YUV 420 format to the RGB format. This disclosure does not change the above packing and unpacking procedures. In order to achieve a better RGB transform to recover and obtain a better original depth pixel values, this disclosure will adjust the original RGB format of the pixels of the depth frame (the unadjusted RGB format) to obtain a new RGB format (the adjusted RGB format). Then, the image data are transformed from the adjusted RGB format to the YUV422 or YUV 420 format and outputted. After the receiving end receives the image data in YUV422 or YUV 420 format, the image data in YUV422 or YUV 420 format are decompressed and transformed to the RGB format (the unreconstructed RGB format). Afterwards, the reconstruction method of this disclosure is performed to obtain the subpixel values in the reconstructed RGB format. This procedure can improve the distortion around the area having large (or dramatic) depth gap. Accordingly, the adjustment method of this disclosure is to adjust (transform) the image data from the unadjusted RGB format to the adjusted RGB format, and the reconstruction method of this disclosure is to reconstruct the image data from the unreconstructed RGB format to the reconstructed RGB format.

Figure 1A:
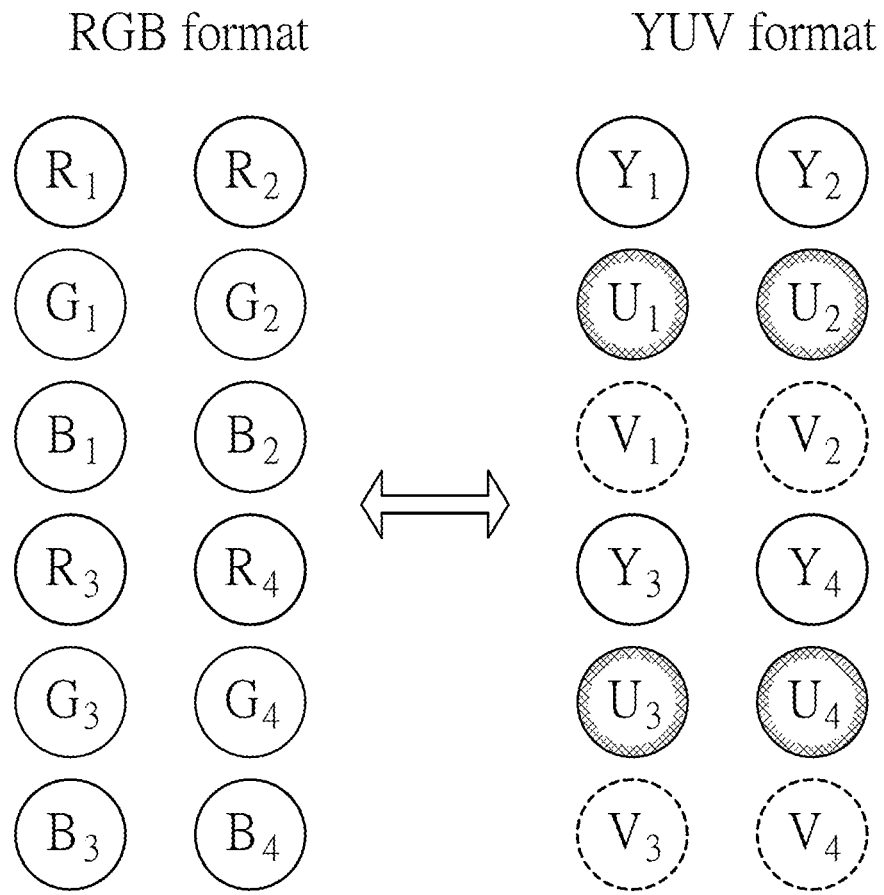
FIGS. 1A and 1B are schematic diagrams showing the conversions between RGB format and YUV format of the subpixels of the depth vertical pixels and the depth horizontal pixels, respectively.
Figure 1B:
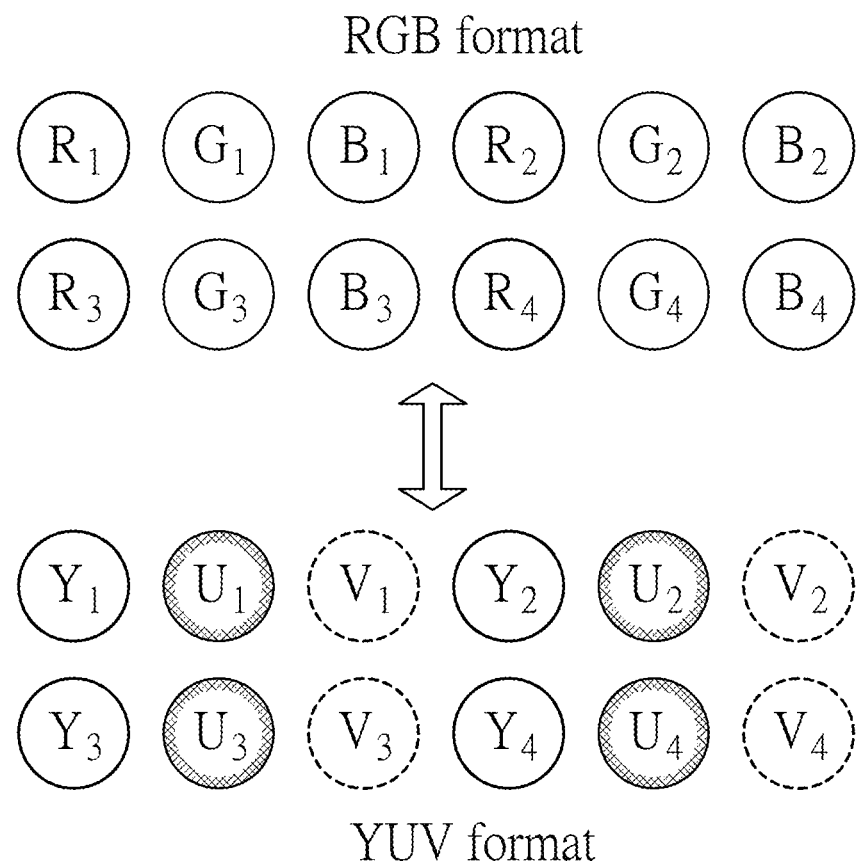
Figure 2A:
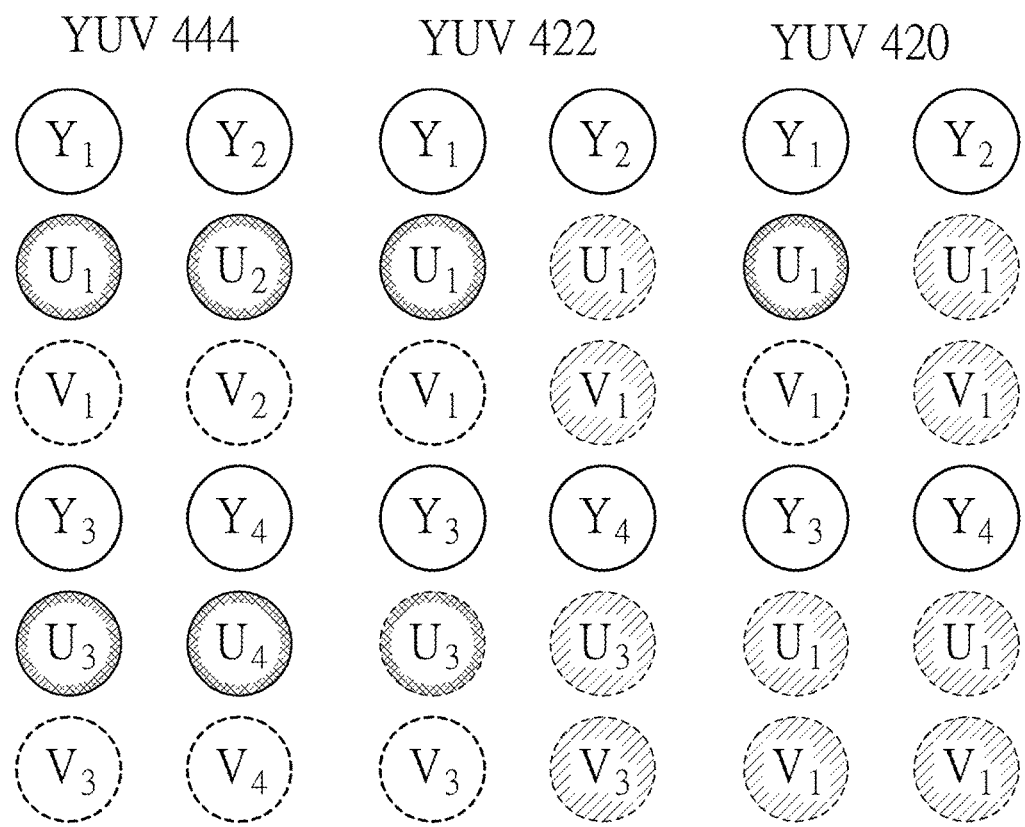
FIGS. 2A and 2B are schematic diagrams showing the depth vertical packages and the depth horizontal packages transmitted in YUV444 format, YUV422 format, and YUV420 format.
Figure 2B:
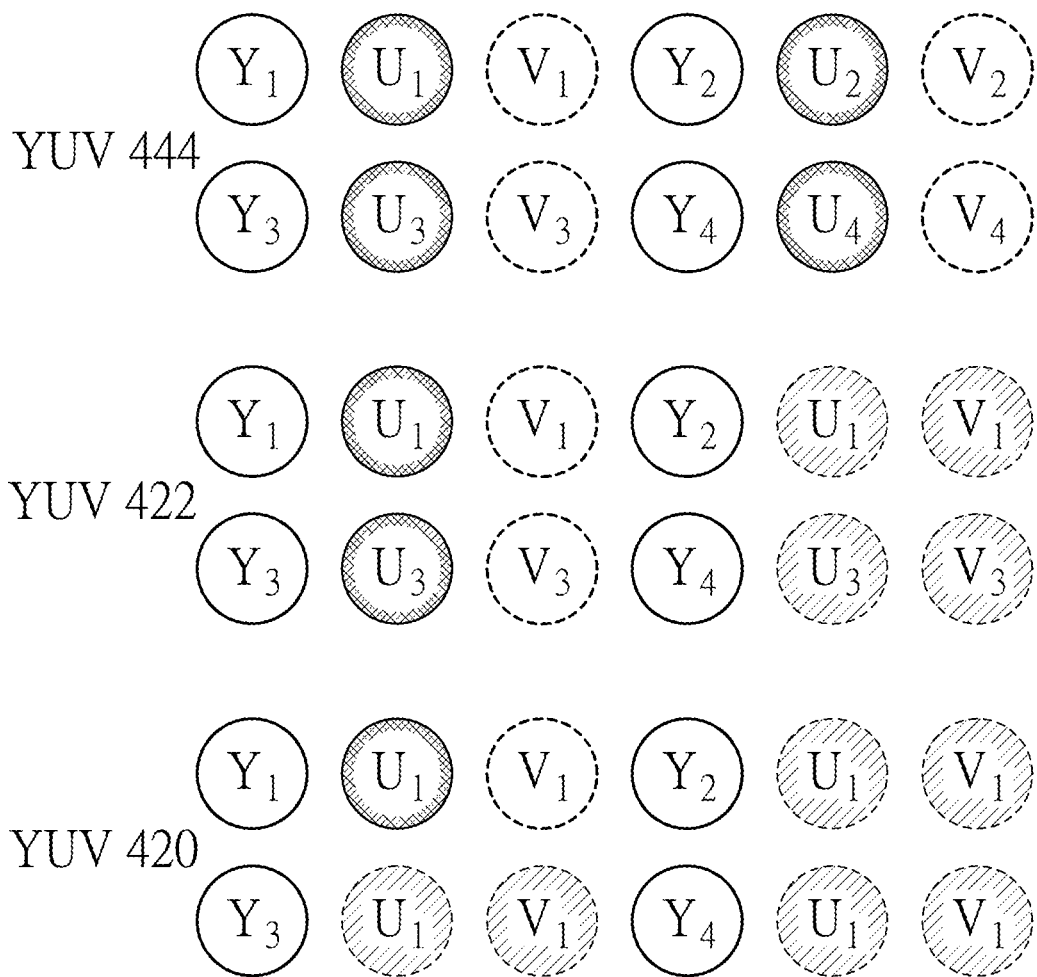

Referring to FIGS. 2 and 2B and Tables 1 and 2, in the YUV 420 format, $\{Y_1, U_1, V_1\}$ can be put into the equation (2) to obtain the completely reconstructed $\{R_1, G_1, B_1\}$. Besides, $\{Y_2, U_2, V_2\}$, $\{Y_3, U_3, V_3\}$ and $\{Y_4, U_4, V_4\}$ can only have adjustment in subpixels to select one subpixel for the reconstruction. In general, $\{Y_2, U_1, V_1\}$ cannot be reconstructed to obtain the entire $\{R_2, G_2, B_2\}$. This disclosure can adjust $Y_2$ and select a proper subpixel for completely reconstruction, and then the adjusted $Y_2$ can be used to correspondingly adjust the values of $\{R_2, G_2, B_2\}$.

Assuming $G_2$ is selected for the completely reconstructed subpixel, $G_2$ can be calculated by equation (2) and shown as follow:

$$G_2 = 1.1644 \times (Y_2 - 16) - 0.3917 \times (U_1 - 128) - 0.8130 \times (V_1 - 128) \quad (3)$$

In equation (1), $U_1$ and $V_1$ can be shown as follow:

$$U_1 = -0.1482 \times R_1 - 0.2910 \times G_1 + 0.4392 \times B_1 + 128 \quad (4)$$

$$V_1 = 0.4392 \times R_1 - 0.3678 \times G_1 - 0.0714 \times B_1 + 128 \quad (5)$$

In this case, $G_2$ is set as a known completely reconstructed value, $U_1$ of equation (4) and $V_1$ of equation (5) are put into equation (3), and the adjusted $Y_2$ (expressed as $Y_2'$) will be:

$$Y_2' = 0.8588 \times (G_2 + 0.2290 \times R_1 - 0.4130 \times G_1 + 0.1140 \times B_1) + 16 \quad (6)$$

In fact, in equation (1), the adjusted $Y_2'$ can be expressed by $R_2$, $G_2$ and $B_2$ (expressed as $R_2'$, $G_2'$ and $B_2'$):

$$Y_2' = 0.2568 \times R_2' + 0.5041 \times G_2' + 0.0979 \times B_2' + 16 \quad (7)$$

In order to satisfy $Y_2'$ of equation (6), the corresponding $R_2'$, $G_2'$ and $B_2'$ can be optionally equivalent (if so, the following calculations will be simpler), and the adjusted value is:

$$R_2' = G_2' = B_2' = G_2 + 0.2990 \times R_1 - 0.4130 \times G_1 + 0.1140 \times B_1 \quad (8)$$

Similarly, if $G_3$ is selected as a completely reconstructed subpixel, the corresponding $R_3'$, $G_3'$ and $B_3'$ can be adjusted as:

$$R_3' = G_3' = B_3' = G_3 + 0.2990 \times R_1 - 0.4130 \times G_1 + 0.1140 \times B_1 \quad (9)$$

Similarly, if $B_4$ is selected as a completely reconstructed subpixel, $B_4$ can be:

$$B_4 = 1.1644 \times (Y_4 - 16) - 2.0173 \times (V_1 - 128) - 0.0001 \times (U_1 - 128) \quad (10)$$

Accordingly, the adjusted $Y_4$ (expressed as $Y_4'$) will be:

$$Y_4' = 0.8588 \times (B_4 + 0.2290 \times R_1 - 0.5870 \times G_1 - 0.8860 \times B_1) + 16 \quad (11)$$

Similarly, the corresponding adjusted $R_4'$, $G_4'$ and $B_4'$ can be optionally equivalent, and their adjusted values will be:

$$R_4' = G_4' = B_4' = B_4 + 0.2990 \times R_1 + 0.5870 \times G_1 - 0.8860 \times B_1 \quad (12)$$

Accordingly, when the compression and decompression system adopts the YUV 420 format, there are six RGB subpixels having interleaved positions (from twelve subpixels in four pixels) can be reconstructed, and the residual six lost RGB subpixels can be recovered by the neighboring reconstructed RGB subpixels with utilizing the interpolation method.

Similarly, when the compression and decompression system adopts the YUV 422 format, there are eight RGB subpixels from twelve subpixels in four pixels (including six RGB subpixels having interleaved positions and two RGB subpixels located at outer side) can be reconstructed according to the above RGB format adjustment method, and the residual four lost RGB subpixels can be recovered by the neighboring reconstructed RGB subpixels with utilizing the interpolation method. Therefore, a better RGB format conversion can be obtained without obtaining or contacting Y, U and V values of the YUV format so as to recover a better original depth pixel values.

The RGB format adjustment and reconstruction method of the present disclosure can be applied to the above equations. To be noted, the parameters in the matrix of the above-mentioned equations (1) and (2) are for examples only. In different video compression transmission system, the parameters in the matrix can be different. The user can calculate different reconstruction equations (3) to (12) according to the above theory. For example, the conversion matrix from RGB to YUV and the conversion matrix from YUV to RGB in different video compression transmission system are shown in the following tables 3 and 4. According to the conversion equations as shown in tables 3 and 4, the user can obtain different equations (3) to (12), and the detailed descriptions thereof will be omitted.

TABLE 3 conversion from RGB to YUV $$\begin{bmatrix} Y_i \\ U_i \\ U_i \end{bmatrix} = \begin{bmatrix} 0.2999 & 0.587 & 0.114 \\ -0.169 & -0.331 & 0.500 \\ 0.500 & -0.419 & -0.081 \end{bmatrix} \begin{bmatrix} R_i \\ G_i \\ B_i \end{bmatrix} + \begin{bmatrix} 0 \\ 128 \\ 128 \end{bmatrix}$$

TABLE 4 conversion from YUV to RGB $$\begin{bmatrix} R_i \\ G_i \\ B_i \end{bmatrix} = \begin{bmatrix} 1 & 0.00093 & 1.401687 \\ 1 & -0.3437 & -0.71417 \\ 1 & 2.0173 & -0.00099 \end{bmatrix} \begin{bmatrix} Y_i \\ U_i - 128 \\ V_i - 128 \end{bmatrix}$$

The RGB format adjustment and reconstruction method and circuit for depth frame packing and depacking will be further described hereinafter with reference to different embodiments.

Figure 3A:
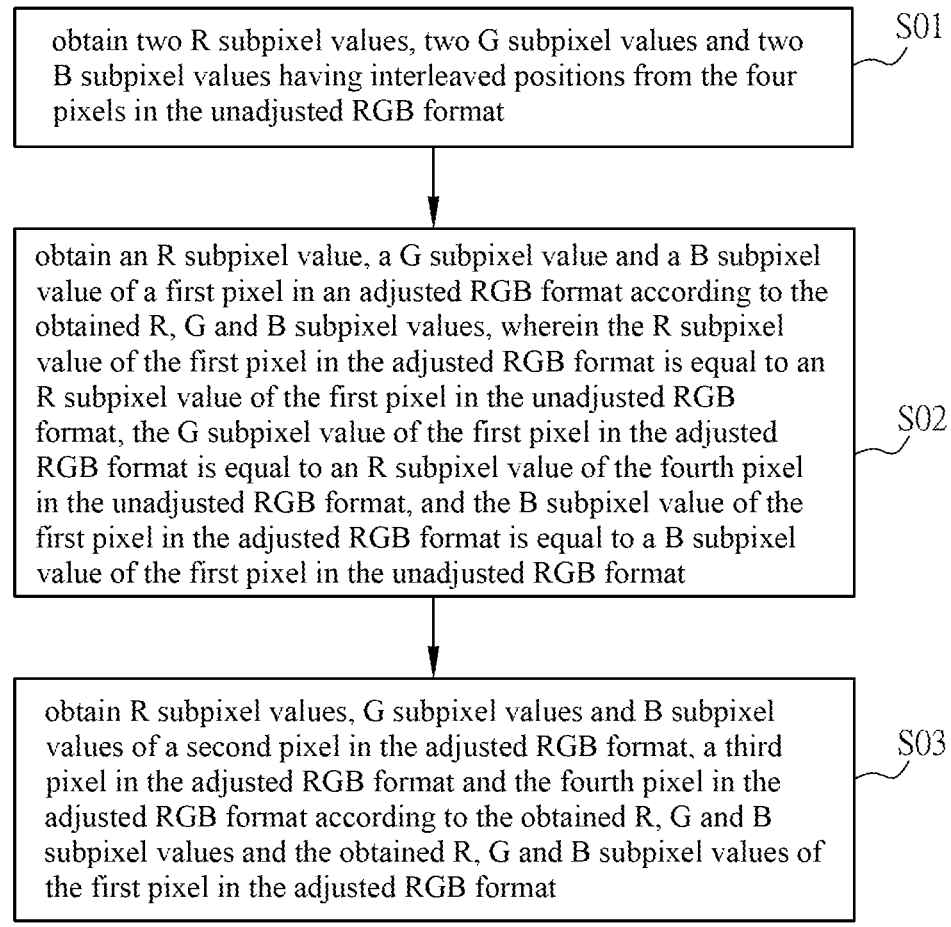
FIG. 3A is a flow chart showing an RGB format adjustment method for depth frame packing and depacking according to an embodiment of the disclosure.
Figure 3B:
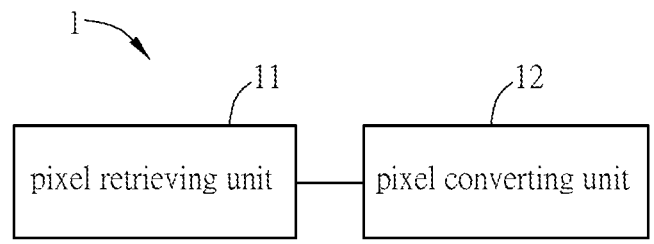
FIG. 3B is a schematic block diagram showing an RGB format adjustment circuit for depth frame packing and depacking according to an embodiment of the disclosure.

FIG. 3A is a flow chart showing an RGB format adjustment method for depth frame packing and depacking according to an embodiment of the disclosure, and FIG. 3B is a schematic block diagram showing an RGB format adjustment circuit 1 for depth frame packing and depacking according to an embodiment of the disclosure. In this embodiment, the adjustment method can be also named as a conversion method.

A gray-level image data, such as, for example but not limited to a depth frame, can be originally in the RGB format (the unadjusted RGB format). The RGB format includes an R subpixel, a G subpixel and a B subpixel. The image data in the RGB format may include a group of neighboring pixels (four pixels). In other words, each group includes four neighboring pixels. Therefore, the pixels of all groups in the image data can be adjusted from the unadjusted RGB format to the adjusted RGB format. The four pixels of each group can be arranged in vertical or in horizontal and can be a first pixel, a second pixel, a third pixel and a fourth pixel. That is, there are totally twelve subpixels in the four pixels. The first pixel is arranged neighboring the second pixel and the third pixel, and the fourth pixel is arranged neighboring the second pixel and the third pixel. In this embodiment, four pixels include twelve subpixels. The R, G and B subpixels of each pixel are arranged in vertical, which means that the R, G and B subpixels of each pixel are arranged in one column. The R, G and B subpixels of each pixel are arranged in horizontal, which means that the R, G and B subpixels of each pixel are arranged in one row.

As shown in FIG. 3A, the RGB format adjustment method for depth frame packing and depacking includes steps S01 to S03. The step S01 is to obtain two R subpixel values, two G subpixel values and two B subpixel values having interleaved positions from the four pixels in the unadjusted RGB format. The step S02 is to obtain an R subpixel value, a G subpixel value and a B subpixel value of a first pixel in an adjusted RGB format according to the obtained R, G and B subpixel values, wherein the R subpixel value of the first pixel in the adjusted RGB format is equal to an R subpixel value of the first pixel in the unadjusted RGB format, the G subpixel value of the first pixel in the adjusted RGB format is equal to an R subpixel value of the fourth pixel in the unadjusted RGB format, and the B subpixel value of the first pixel in the adjusted RGB format is equal to a B subpixel value of the first pixel in the unadjusted RGB format. The step S03 is to obtain R subpixel values, G subpixel values and B subpixel values of a second pixel in the adjusted RGB format, a third pixel in the adjusted RGB format and the fourth pixel in the adjusted RGB format according to the obtained R, G and B subpixel values and the obtained R, G and B subpixel values of the first pixel in the adjusted RGB format. The adjustment method of FIG. 3A can be applied to four pixels arranged in vertical or in horizontal, and the coding and decoding system is in a YUV420 format.

In addition, as shown in FIG. 3B, the conversion circuit 1 of this embodiment includes a pixel retrieving unit 11 and a pixel converting unit 12. The pixel retrieving unit 11 is electrically connected to the pixel converting unit 12. The pixel retrieving unit 11 obtains two R subpixel values, two G subpixel values and two B subpixel values having interleaved positions from the four pixels in the unadjusted RGB format. The pixel converting unit 12 obtains the R subpixel value, the G subpixel value and the B subpixel value of the first pixel in the adjusted RGB format according to the two R subpixel values, the two G subpixel values, and the two B subpixel values obtained by the pixel retrieving unit. The R subpixel value of the first pixel in the adjusted RGB format is equal to the R subpixel value of the first pixel in the unadjusted RGB format, the G subpixel value of the first pixel in the adjusted RGB format is equal to the R subpixel value of the fourth pixel in the unadjusted RGB format, and the B subpixel value of the first pixel in the adjusted RGB format is equal to the B subpixel value of the first pixel in the unadjusted RGB format. The pixel converting unit 12 further obtains the R subpixel values, the G subpixel values and the B subpixel values of the second pixel in the adjusted RGB format, the third pixel in the adjusted RGB format and the fourth pixel in the adjusted RGB format according to the two R subpixel values, the two G subpixel values and the two B subpixel values obtained by the pixel retrieving unit, and the obtained R, G and B subpixel values of the first pixel in the adjusted RGB format. In this case, the pixel retrieving unit 11 and the pixel converting unit 12 can be carried out by hardware circuits or firmware. In one embodiment, the conversion circuit 1 may include, for example, an adder, a subtractor, a multiplier, and/or a divider.

In some embodiments, the pixel converting unit 12 can adjust the four pixels of one group from the unadjusted RGB format to the adjusted RGB format, and the pixels in the adjusted RGB format are stored in the corresponding positions of the first pixel, the second pixel, the third pixel and the fourth pixel of the same group. In other embodiments, the pixel converting unit 12 can adjust the pixels of all groups from the unadjusted RGB format to the adjusted RGB format, and all pixels in the adjusted RGB format are stored in the corresponding positions of the first pixels, the second pixels, the third pixels and the fourth pixels of the groups. This disclosure is not limited. In addition, a memory unit (not shown) is provided to electrically connect with the pixel retrieving unit 11 and the pixel converting unit 12 for storing the image data before and after the conversion process.

Figure 4A:
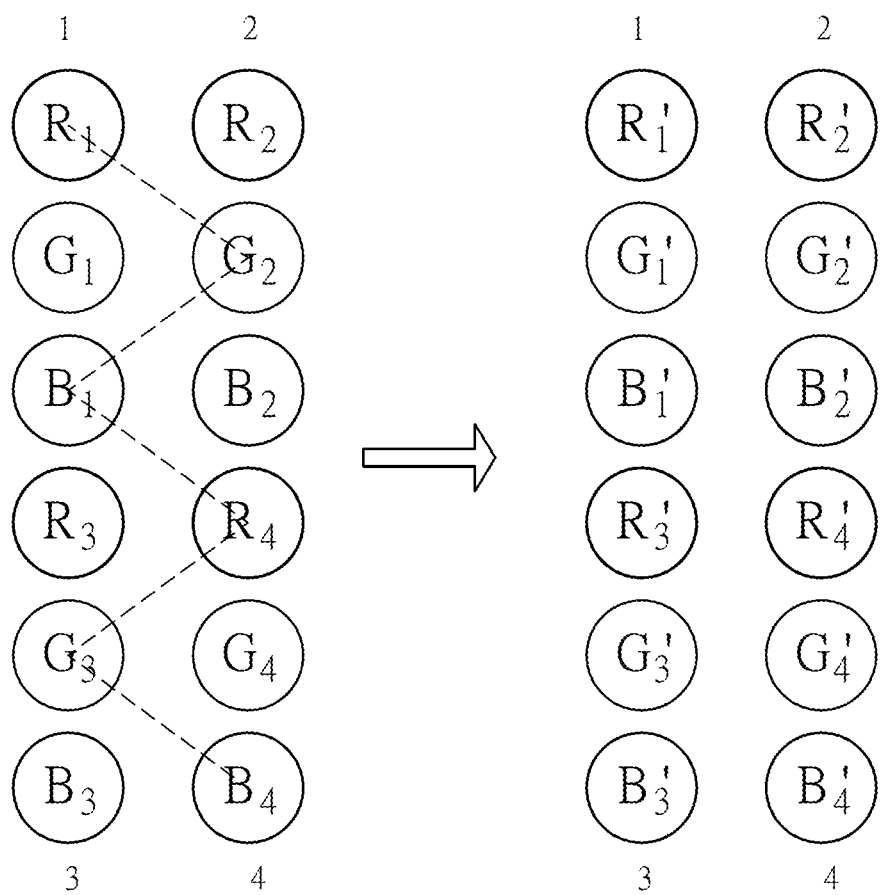
FIGS. 4A and 4B are schematic diagrams showing an image data of an embodiment, which is transformed from an unadjusted RGB format to an adjusted RGB format.
Figure 4B:
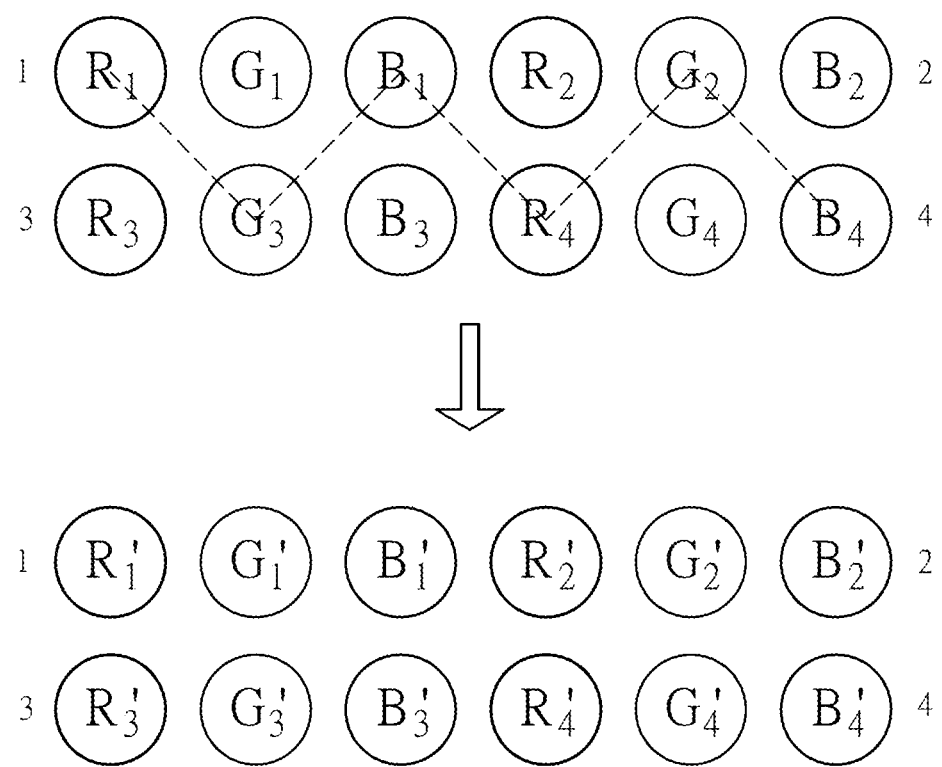

FIGS. 4A and 4B are schematic diagrams showing an image data of an embodiment, which is transformed from an unadjusted RGB format to an adjusted RGB format.

In this embodiment, each pixel includes three subpixels, which are red, green and blue subpixels (R, G and B). The R, G and B subpixels of each pixel are arranged in vertical (as shown in FIG. 4A) or in horizontal (as shown in FIG. 4B). After the adjustment process, each pixel of the RGB format image data also include three subpixels arranged in vertical or in horizontal.

The position and subpixel value of each subpixel are assigned with corresponding labels. For example, as shown in FIG. 4A, $R_1$ represents the position and subpixel value of the R subpixel of the first pixel in the unadjusted RGB format, $G_1$ represents the position and subpixel value of the G subpixel of the first pixel in the unadjusted RGB format, and $B_1$ represents the position and subpixel value of the B subpixel of the first pixel in the unadjusted RGB format. Similarly, $R_1'$ represents the position and subpixel value of the R subpixel of the first pixel in the adjusted RGB format, $G_1'$ represents the position and subpixel value of the G subpixel of the first pixel in the adjusted RGB format, and $B_1'$ represents the position and subpixel value of the B subpixel of the first pixel in the adjusted RGB format. The other subpixels are labeled in the same rule. In addition, in FIG. 4A, the first pixel in the RGB format includes three subpixels located at the left-top corner in vertical (represented by 1), the second pixel in the RGB format includes three subpixels located at the right-top corner in vertical (represented by 2), the third pixel in the RGB format includes three subpixels located at the left-bottom corner in vertical (represented by 3), and the fourth pixel in the RGB format includes three subpixels located at the right-bottom corner in vertical (represented by 4). In FIG. 4B, the first pixel in the RGB format includes three subpixels located at the left-top corner in horizontal (represented by 1), the second pixel in the RGB format includes three subpixels located at the right-top corner in horizontal (represented by 2), the third pixel in the RGB format includes three subpixels located at the left-bottom corner in horizontal (represented by 3), and the fourth pixel in the RGB format includes three subpixels located at the right-bottom corner in horizontal (represented by 4). To be noted, this disclosure is not limited thereto. In some embodiments, the positions of the first to fourth pixels can be changed, and any arrangement fitting the requirement that the first pixel is located adjacent to the second and third pixels and the fourth pixel is located adjacent to the second and third pixels can be used in this disclosure.

When the coding and decoding system adopts YUV420 format, in the RGB format adjustment method for depth frame packing and depacking of this embodiment, the pixel retrieving unit 11 obtains two R subpixel values, two G subpixel values and two B subpixel values having interleaved positions from the four pixels in the unadjusted RGB format. In the four pixels, as shown in FIGS. 4A and 4B, the pixel retrieving unit 11 obtains the R subpixel values of the first pixel in the unadjusted RGB format and the fourth pixel in the unadjusted RGB format, the G subpixel values of the second pixel in the unadjusted RGB format and the third pixel in the unadjusted RGB format, and the B subpixel values of the first pixel in the unadjusted RGB format and the fourth pixel in the unadjusted RGB format. In other words, six subpixel values (including $R_1$, $G_2$, $B_1$, $R_4$, $G_3$ and $B_4$) having interleaved positions in the four pixels located in vertical or horizontal are obtained.

Afterwards, the pixel converting unit 12 obtains the R subpixel value, the G subpixel value and the B subpixel value of the first pixel in the adjusted RGB format according to the obtained six subpixel values (including $R_1$, $G_2$, $B_1$, $R_4$, $G_3$ and $B_4$). In this case, the R subpixel value of the first pixel in the adjusted RGB format is equal to the R subpixel value of the first pixel in the unadjusted RGB format ($R_1'=R_1$), the G subpixel value of the first pixel in the adjusted RGB format is equal to the R subpixel value of the fourth pixel in the unadjusted RGB format ($G_1'=R_4$), and the B subpixel value of the first pixel in the adjusted RGB format is equal to the B subpixel value of the first pixel in the unadjusted RGB format ($B_1'=B_1$). In other words, the first group of $R_1'$, $G_1'$ and $B_1'$ are three subpixels that can be completely reconstructed.

The pixel converting unit 12 further obtains the R subpixel values, the G subpixel values and the B subpixel values of the second pixel in the adjusted RGB format, the third pixel in the adjusted RGB format and the fourth pixel in the adjusted RGB format according to the obtained six subpixel values (including $R_1$, $G_2$, $B_1$, $R_4$, $G_3$ and $B_4$) and the obtained R, G and B subpixel values of the first pixel in the adjusted RGB format (including $R_1'$, $G_1'$ and $B_1'$). Accordingly, the second group is mainly for reconstructing the $G_2$ subpixel. In the four pixels in the adjusted RGB format, all subpixel values of the second pixel ($R_2'$, $G_2'$ and $B_2'$) are equal to each other and can satisfy the following equation:

$$R_2'=G_2'=B_2'=G_2+0.2990\times R_1'-0.4130\times G_1'+0.1140\times B_1'.$$

In addition, the third group is mainly for reconstructing the $G_3$ subpixel. In the four pixels in the adjusted RGB format, all subpixel values of the third pixel ($R_3'$, $G_3'$ and $B_3'$) are equal to each other and can satisfy the following equation:

$$R_3'=G_3'=B_3'=G_3+0.2990\times R_1'-0.4130\times G_1'+0.1140\times B_1'.$$

In addition, the fourth group is mainly for reconstructing the $B_4$ subpixel. In the four pixels in the adjusted RGB format, all subpixel values of the fourth pixel ($R_4'$, $G_4'$ and $B_4'$) are equal to each other and can satisfy the following equation:

$$R_4'=G_4'=B_4'=B_4+0.2990\times R_1'+0.5870\times G_1'-0.8860\times B_1'.$$

Accordingly, the twelve subpixel values in the adjusted RGB format can be obtained.

Figure 5:
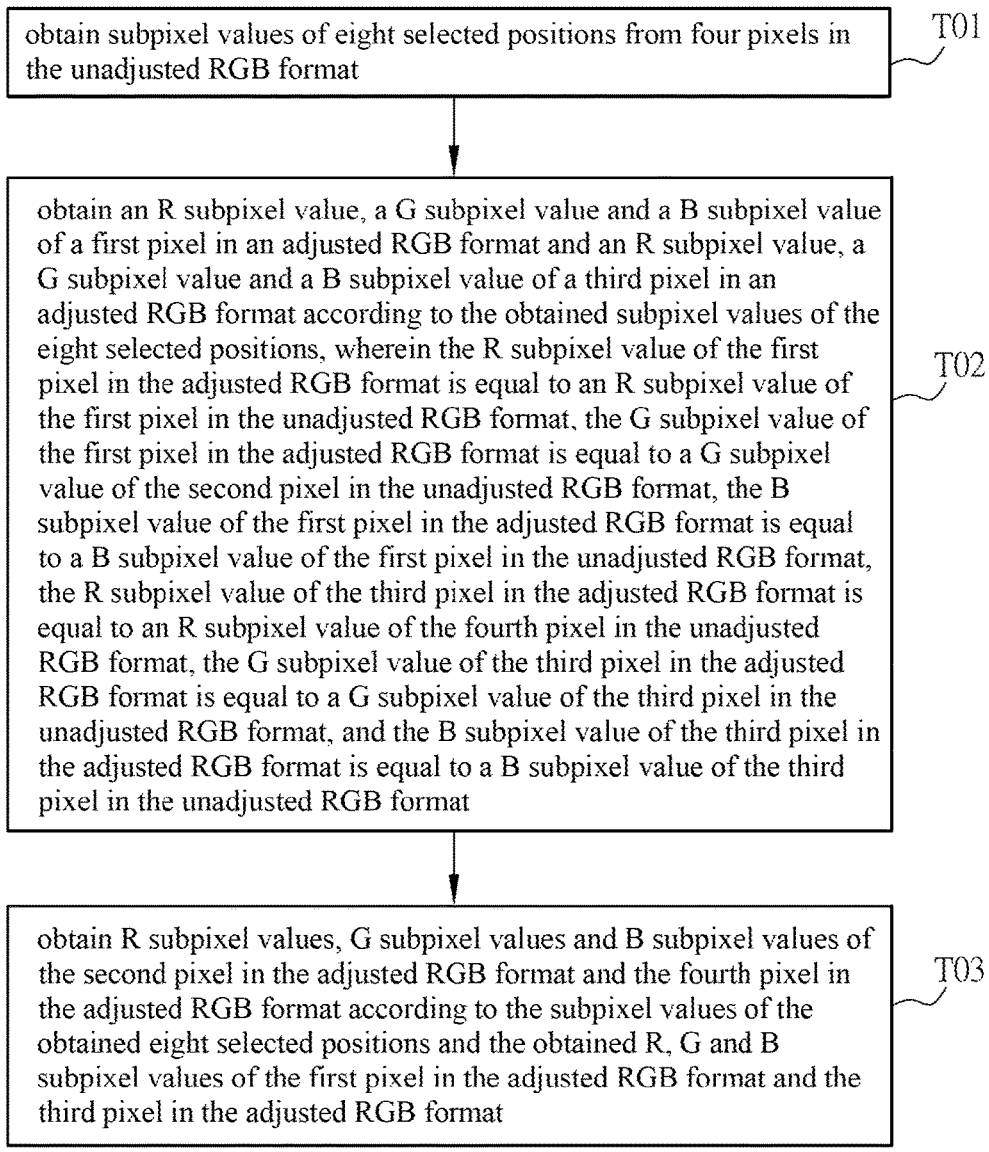
FIGS. 5 and 6 are flow charts showing different RGB format adjustment methods for depth frame packing and depacking according to the embodiment of the disclosure.

FIG. 5 is a flow chart showing another RGB format adjustment method for depth frame packing and depacking according to the embodiment of the disclosure.

As shown in FIG. 5, another RGB format adjustment method for depth frame packing and depacking includes steps T01 to T03. The step T01 is to obtain subpixel values of eight selected positions from four pixels in the unadjusted RGB format. The step T02 is to obtain an R subpixel value, a G subpixel value and a B subpixel value of a first pixel in an adjusted RGB format and an R subpixel value, a G subpixel value and a B subpixel value of a third pixel in an adjusted RGB format according to the obtained subpixel values of the eight selected positions, wherein the R subpixel value of the first pixel in the adjusted RGB format is equal to an R subpixel value of the first pixel in the unadjusted RGB format, the G subpixel value of the first pixel in the adjusted RGB format is equal to a G subpixel value of the second pixel in the unadjusted RGB format, the B subpixel value of the first pixel in the adjusted RGB format is equal to a B subpixel value of the first pixel in the unadjusted RGB format, the R subpixel value of the third pixel in the adjusted RGB format is equal to an R subpixel value of the fourth pixel in the unadjusted RGB format, the G subpixel value of the third pixel in the adjusted RGB format is equal to a G subpixel value of the third pixel in the unadjusted RGB format, and the B subpixel value of the third pixel in the adjusted RGB format is equal to a B subpixel value of the third pixel in the unadjusted RGB format. The step T03 is to obtain R subpixel values, G subpixel values and B subpixel values of the second pixel in the adjusted RGB format and the fourth pixel in the adjusted RGB format according to the subpixel values of the obtained eight selected positions and the obtained R, G and B subpixel values of the first pixel in the adjusted RGB format and the third pixel in the adjusted RGB format. The adjustment method of FIG. 5 can be applied to four pixels arranged in vertical, and the coding and decoding system is in a YUV420 format.

The pixel retrieving unit 11 obtains subpixel values of eight selected positions from the four pixels of each group of the image data in the unadjusted RGB format. The pixel converting unit 12 obtains an R subpixel value, a G subpixel value and a B subpixel value of a first pixel in an adjusted RGB format and an R subpixel value, a G subpixel value and a B subpixel value of a third pixel in an adjusted RGB format according to the obtained subpixel values of the eight selected positions. The pixel converting unit 12 further obtains R subpixel values, G subpixel values and B subpixel values of the second pixel in the adjusted RGB format and the fourth pixel in the adjusted RGB format according to the subpixel values of the obtained eight selected positions and the obtained R, G and B subpixel values of the first pixel in the adjusted RGB format and the third pixel in the adjusted RGB format. The R subpixel value of the first pixel in the adjusted RGB format is equal to an R subpixel value of the first pixel in the unadjusted RGB format, the G subpixel value of the first pixel in the adjusted RGB format is equal to a G subpixel value of the second pixel in the unadjusted RGB format, the B subpixel value of the first pixel in the adjusted RGB format is equal to a B subpixel value of the first pixel in the unadjusted RGB format, the R subpixel value of the third pixel in the adjusted RGB format is equal to an R subpixel value of the fourth pixel in the unadjusted RGB format, the G subpixel value of the third pixel in the adjusted RGB format is equal to a G subpixel value of the third pixel in the unadjusted RGB format, and the B subpixel value of the third pixel in the adjusted RGB format is equal to a B subpixel value of the third pixel in the unadjusted RGB format.

When the coding and decoding system adopts YUV422 format and the four pixels of the depth frame in the unadjusted RGB format are arranged in vertical, in the RGB format adjustment method for depth frame packing and depacking of this embodiment, the pixel retrieving unit 11 obtains three R subpixel values, two G subpixel values and three B subpixel values from the four pixels in the unadjusted RGB format. In the four pixels, as shown in FIG. 4A, the pixel retrieving unit 11 obtains eight selected positions in the unadjusted RGB format, which includes the R subpixel value and the B subpixel value of the first pixel in the unadjusted RGB format, the R subpixel value and the G subpixel value of the second pixel in the unadjusted RGB format, the G subpixel value and the B subpixel value of the third pixel in the unadjusted RGB format, and the R subpixel value and the B subpixel value of the fourth pixel in the unadjusted RGB format (three R subpixel values, two G subpixel values and three B subpixel values). In other words, six subpixel values (including $R_1$, $G_2$, $B_1$, $R_4$, $G_3$ and $B_4$) having interleaved positions in the four pixels and two subpixel values ($R_2$ and $B_3$) of the selected positions are obtained.

Afterwards, the pixel converting unit 12 obtains the R subpixel value, the G subpixel value and the B subpixel value of the first pixel in the adjusted RGB format and the R subpixel value, the G subpixel value and the B subpixel value of the third pixel in the adjusted RGB format according to the obtained eight subpixel values (including $R_1$, $G_2$, $B_1$, $R_4$, $G_3$, $B_4$, $R_2$ and $B_3$) of the selected positions. In this case, the R subpixel value of the first pixel in the adjusted RGB format is equal to the R subpixel value of the first pixel in the unadjusted RGB format ($R_1'=R_1$), the G subpixel value of the first pixel in the adjusted RGB format is equal to the G subpixel value of the second pixel in the unadjusted RGB format ($G_1'=G_2$), and the B subpixel value of the first pixel in the adjusted RGB format is equal to the B subpixel value of the first pixel in the unadjusted RGB format ($B_1'=B_1$). In addition, the R subpixel value of the third pixel in the adjusted RGB format is equal to an R subpixel value of the fourth pixel in the unadjusted RGB format ($R_3'=R_4$), the G subpixel value of the third pixel in the adjusted RGB format is equal to a G subpixel value of the third pixel in the unadjusted RGB format ($G_3'=G_3$), and the B subpixel value of the third pixel in the adjusted RGB format is equal to a B subpixel value of the third pixel in the unadjusted RGB format ($B_3'=B_3$). In other words, each of the first group of $R_1'$, $G_1'$ and $B_1'$ and the third group of $R_3'$, $G_3'$ and $B_3'$ are three subpixels that can be completely reconstructed.

The pixel converting unit 12 further obtains the R subpixel values, the G subpixel values and the B subpixel values of the second pixel in the adjusted RGB format and the fourth pixel in the adjusted RGB format according to the obtained eight subpixel values (including $R_1$, $G_2$, $B_1$, $R_4$, $G_3$, $B_4$, $R_2$ and $B_3$) and the obtained R, G and B subpixel values of the first pixel in the adjusted RGB format and the third pixel in the adjusted RGB format (including $R_1'$, $G_1'$, $B_1'$, $R_3'$, $G_3'$ and $B_3'$). Accordingly, the second group is mainly for reconstructing the $R_2$ subpixel. In the four pixels in the adjusted RGB format, all subpixel values of the second pixel ($R_2'$, $G_2'$ and $B_2'$) are equal to each other and can satisfy the following equation:

$$R_2'=G_2'=B_2'=R_2-0.7010\times R_1'+0.5870\times G_1'+0.1140\times B_1'.$$

In addition, the fourth group is mainly for reconstructing the $B_4$ subpixel. In the four pixels in the adjusted RGB format, all subpixel values of the fourth pixel ($R_4'$, $G_4'$ and $B_4'$) are equal to each other and can satisfy the following equation:

$$R_4'=G_4'=B_4'=B_4+0.2990\times R_3'+0.5870\times G_3'-0.8860\times B_3'.$$

Accordingly, the twelve subpixel values in the adjusted RGB format can be obtained.

Figure 6:
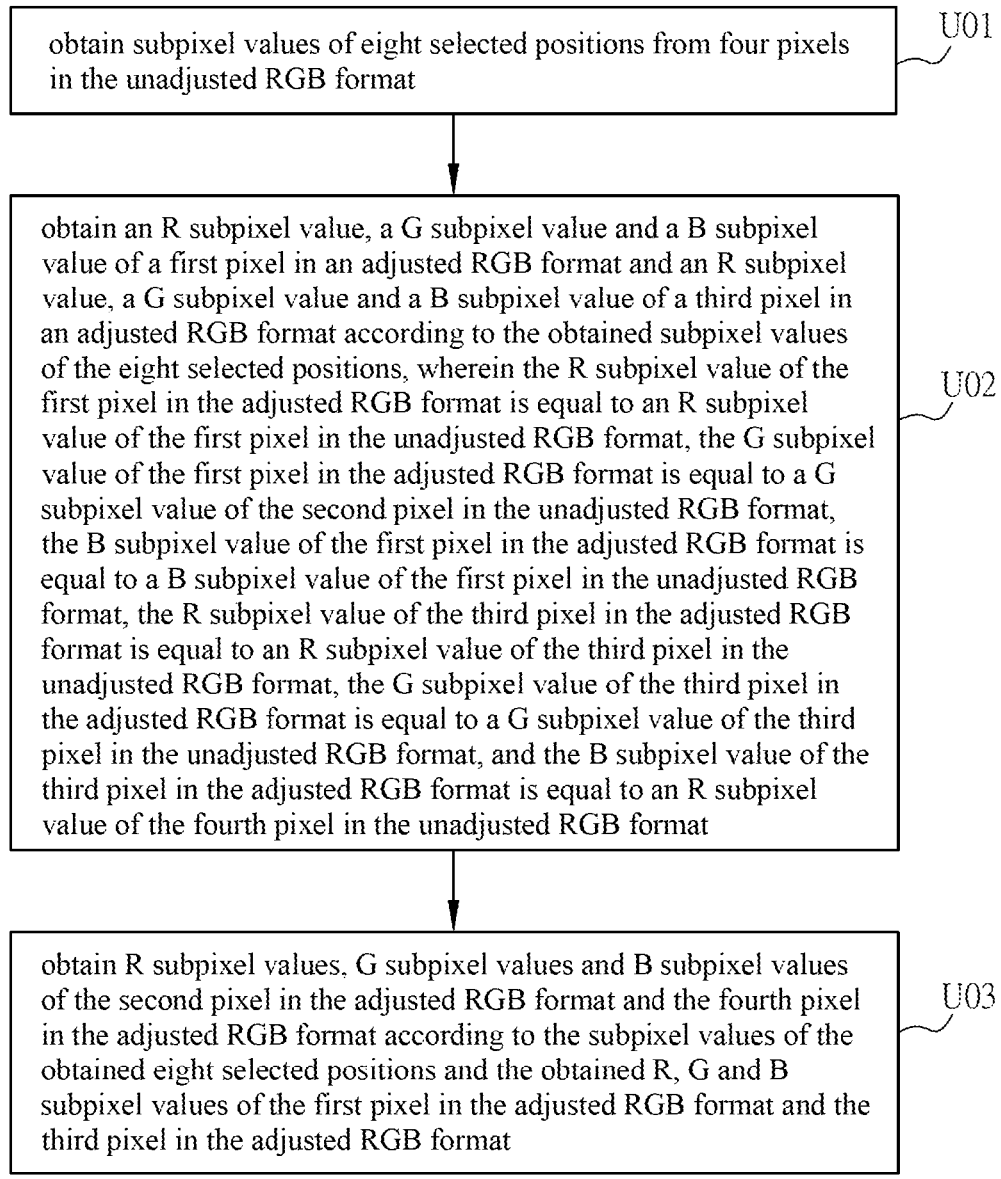

FIG. 6 is a flow chart showing another RGB format adjustment method for depth frame packing and depacking according to the embodiment of the disclosure.

As shown in FIG. 6, another RGB format adjustment method for depth frame packing and depacking includes steps U01 to U03. The step U01 is to obtain subpixel values of eight selected positions from four pixels in the unadjusted RGB format. The step U02 is to obtain an R subpixel value, a G subpixel value and a B subpixel value of a first pixel in an adjusted RGB format and an R subpixel value, a G subpixel value and a B subpixel value of a third pixel in an adjusted RGB format according to the obtained subpixel values of the eight selected positions, wherein the R subpixel value of the first pixel in the adjusted RGB format is equal to an R subpixel value of the first pixel in the unadjusted RGB format, the G subpixel value of the first pixel in the adjusted RGB format is equal to a G subpixel value of the second pixel in the unadjusted RGB format, the B subpixel value of the first pixel in the adjusted RGB format is equal to a B subpixel value of the first pixel in the unadjusted RGB format, the R subpixel value of the third pixel in the adjusted RGB format is equal to an R subpixel value of the third pixel in the unadjusted RGB format, the G subpixel value of the third pixel in the adjusted RGB format is equal to a G subpixel value of the third pixel in the unadjusted RGB format, and the B subpixel value of the third pixel in the adjusted RGB format is equal to an R subpixel value of the fourth pixel in the unadjusted RGB format. The step T03 is to obtain R subpixel values, G subpixel values and B subpixel values of the second pixel in the adjusted RGB format and the fourth pixel in the adjusted RGB format according to the subpixel values of the obtained eight selected positions and the obtained R, G and B subpixel values of the first pixel in the adjusted RGB format and the third pixel in the adjusted RGB format. The adjustment method of FIG. 6 can be applied to four pixels arranged in horizontal, and the coding and decoding system is in a YUV422 format.

The pixel retrieving unit 11 obtains subpixel values of eight selected positions from the four pixels of each group of the image data in the unadjusted RGB format. The pixel converting unit 12 obtains an R subpixel value, a G subpixel value and a B subpixel value of a first pixel in an adjusted RGB format and an R subpixel value, a G subpixel value and a B subpixel value of a third pixel in an adjusted RGB format according to the obtained subpixel values of the eight selected positions. The pixel converting unit 12 further obtains R subpixel values, G subpixel values and B subpixel values of the second pixel in the adjusted RGB format and the fourth pixel in the adjusted RGB format according to the subpixel values of the obtained eight selected positions and the obtained R, G and B subpixel values of the first pixel in the adjusted RGB format and the third pixel in the adjusted RGB format. The R subpixel value of the first pixel in the adjusted RGB format is equal to an R subpixel value of the first pixel in the unadjusted RGB format, the G subpixel value of the first pixel in the adjusted RGB format is equal to a G subpixel value of the second pixel in the unadjusted RGB format, the B subpixel value of the first pixel in the adjusted RGB format is equal to a B subpixel value of the first pixel in the unadjusted RGB format, the R subpixel value of the third pixel in the adjusted RGB format is equal to an R subpixel value of the third pixel in the unadjusted RGB format, the G subpixel value of the third pixel in the adjusted RGB format is equal to a G subpixel value of the third pixel in the unadjusted RGB format, and the B subpixel value of the third pixel in the adjusted RGB format is equal to an R subpixel value of the fourth pixel in the unadjusted RGB format.

When the coding and decoding system adopts YUV422 format and the four pixels of the depth frame in the unadjusted RGB format are arranged in horizontal, in the RGB format adjustment method for depth frame packing and depacking of this embodiment, the pixel retrieving unit 11 obtains three R subpixel values, two G subpixel values and three B subpixel values from the four pixels in the unadjusted RGB format. In the four pixels, as shown in FIG. 4B, the pixel retrieving unit 11 obtains eight selected positions in the unadjusted RGB format, which includes the R subpixel value and the B subpixel value of the first pixel in the unadjusted RGB format, the G subpixel value and the B subpixel value of the second pixel in the unadjusted RGB format, the R subpixel value and the G subpixel value of the third pixel in the unadjusted RGB format, and the R subpixel value and the B subpixel value of the fourth pixel in the unadjusted RGB format. In other words, six subpixel values (including $R_1$, $G_3$, $B_1$, $R_4$, $G_2$ and $B_4$) having interleaved positions in the four pixels and two subpixel values ($B_2$ and $R_3$) of the selected positions are obtained.

Afterwards, the pixel converting unit 12 obtains the R subpixel value, the G subpixel value and the B subpixel value of the first pixel in the adjusted RGB format and the R subpixel value, the G subpixel value and the B subpixel value of the third pixel in the adjusted RGB format according to the obtained eight subpixel values (including $R_1$, $G_3$, $B_1$, $R_4$, $G_2$, $B_4$, $B_2$ and $R_3$) of the selected positions. In this case, the R subpixel value of the first pixel in the adjusted RGB format is equal to the R subpixel value of the first pixel in the unadjusted RGB format ($R_1'=R_1$), the G subpixel value of the first pixel in the adjusted RGB format is equal to the G subpixel value of the second pixel in the unadjusted RGB format ($G_1'=G_2$), and the B subpixel value of the first pixel in the adjusted RGB format is equal to the B subpixel value of the first pixel in the unadjusted RGB format ($B_1'=B_1$). In addition, the R subpixel value of the third pixel in the adjusted RGB format is equal to an R subpixel value of the third pixel in the unadjusted RGB format ($R_3'=R_3$), the G subpixel value of the third pixel in the adjusted RGB format is equal to a G subpixel value of the third pixel in the unadjusted RGB format ($G_3'=G_3$), and the B subpixel value of the third pixel in the adjusted RGB format is equal to an R subpixel value of the fourth pixel in the unadjusted RGB format ($B_3'=R_4$). In other words, each of the first group of $R_1'$, $G_1'$ and $B_1'$ and the third group of $R_3'$, $G_3'$ and $B_3'$ are three subpixels that can be completely reconstructed.

The pixel converting unit 12 further obtains the R subpixel values, the G subpixel values and the B subpixel values of the second pixel in the adjusted RGB format and the fourth pixel in the adjusted RGB format according to the obtained eight subpixel values (including $R_1$, $G_3$, $B_1$, $R_4$, $G_2$, $B_4$, $B_2$ and $R_3$) and the obtained R, G and B subpixel values of the first pixel in the adjusted RGB format and the third pixel in the adjusted RGB format (including $R_1'$, $G_1'$, $B_1'$, $R_3'$, $G_3'$ and $B_3'$). Accordingly, the second group is mainly for reconstructing the $B_2$ subpixel. In the four pixels in the adjusted RGB format, all subpixel values of the second pixel ($R_2'$, $G_2'$ and $B_2'$) are equal to each other and can satisfy the following equation:

$$R_2'=G_2'=B_2'=B_2+0.2990\times R_1'+0.5870\times G_1'-0.8860\times B_1'.$$

In addition, the fourth group is mainly for reconstructing the $B_4$ subpixel. In the four pixels in the adjusted RGB format, all subpixel values of the fourth pixel ($R_4'$, $G_4'$ and $B_4'$) are equal to each other and can satisfy the following equation:

$$R_4'=G_4'=B_4'=B_4+0.2990\times R_3'+0.5870\times G_3'-0.8860\times B_3'.$$

Accordingly, the twelve subpixel values in the adjusted RGB format can be obtained.

Figure 7A:
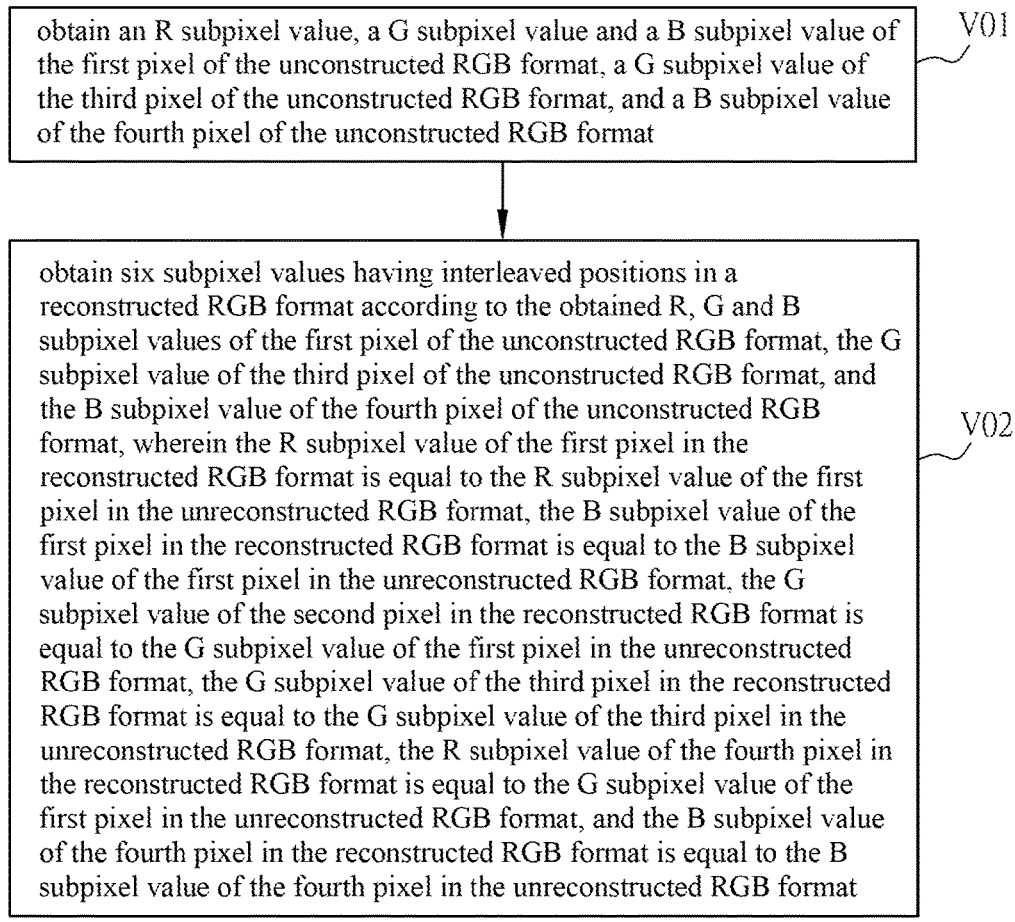
FIG. 7A is a flow chart showing an RGB format reconstruction method for depth frame packing and depacking according to an embodiment of the disclosure.
Figure 7B:
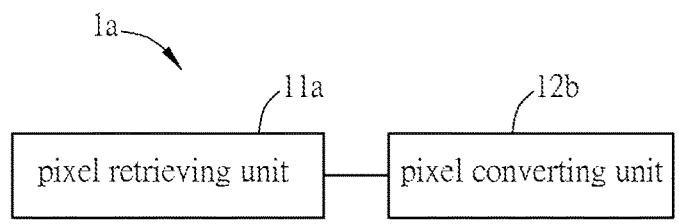
FIG. 7B is a schematic block diagram showing an RGB format reconstruction circuit for depth frame packing and depacking according to an embodiment of the disclosure.

FIG. 7A is a flow chart showing an RGB format reconstruction method for depth frame packing and depacking according to an embodiment of the disclosure, and FIG. 7B is a schematic block diagram showing an RGB format reconstruction circuit 1a for depth frame packing and depacking according to an embodiment of the disclosure. Herein, the reconstruction method can also be named as an inverse conversion method.

A gray-level image data, such as a depth frame, can be originally in the RGB format (the unreconstructed RGB format). The unreconstructed RGB format has been processed by the conventional video compression and decompression system, and the reconstruction method of this disclosure is to convert the depth frame from the unreconstructed RGB format to the reconstructed RGB format. The image data in the unreconstructed RGB format may include a group of neighboring pixels (four pixels). In other words, each group includes four neighboring pixels. The four pixels of each group can be arranged in vertical or in horizontal and can be a first pixel, a second pixel, a third pixel and a fourth pixel. The first pixel is arranged neighboring the second pixel and the third pixel, and the fourth pixel is arranged neighboring the second pixel and the third pixel.

As shown in FIG. 7A, the RGB format reconstruction method for depth frame packing and depacking includes steps V01 to V02. The step V01 is to obtain an R subpixel value, a G subpixel value and a B subpixel value of the first pixel of the unconstructed RGB format, a G subpixel value of the third pixel of the unconstructed RGB format, and a B subpixel value of the fourth pixel of the unconstructed RGB format. The step V02 is to obtain six subpixel values having interleaved positions in a reconstructed RGB format according to the obtained R, G and B subpixel values of the first pixel of the unconstructed RGB format, the G subpixel value of the third pixel of the unconstructed RGB format, and the B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the G subpixel value of the first pixel in the unreconstructed RGB format, and the B subpixel value of the fourth pixel in the reconstructed RGB format is equal to the B subpixel value of the fourth pixel in the unreconstructed RGB format. The reconstruction method of FIG. 7A can be applied to four pixels arranged in vertical or in horizontal, and the coding and decoding system is in a YUV420 format. Besides, the reconstruction method (inverse conversion method) of FIG. 7A is corresponding to the above-mentioned adjustment method (conversion method) of FIG. 3A.

In addition, as shown in FIG. 7B, the reconstruction circuit 1a includes a pixel retrieving unit 11a and a pixel converting unit 12a. The pixel retrieving unit 11a obtains the R subpixel value, the G subpixel value and the B subpixel value of the first pixel of the unconstructed RGB format, the G subpixel value of the third pixel of the unconstructed RGB format, and the B subpixel value of the fourth pixel of the unconstructed RGB format. The pixel converting unit 12a obtains the six subpixel values having interleaved positions in the reconstructed RGB format according to the obtained R, G and B subpixel values of the first pixel of the unconstructed RGB format, the G subpixel value of the third pixel of the unconstructed RGB format, and the B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the G subpixel value of the first pixel in the unreconstructed RGB format, and the B subpixel value of the fourth pixel in the reconstructed RGB format is equal to the B subpixel value of the fourth pixel in the unreconstructed RGB format. In this case, the pixel retrieving unit 11a and the pixel converting unit 12a can be carried out by hardware circuits or firmware. In one embodiment, the conversion circuit 1a may include, for example, an adder, a subtractor, a multiplier, and/or a divider.

In some embodiments, the pixel converting unit 12a can convert the four pixels of one group from the unreconstructed RGB format to the reconstructed RGB format, and the pixels in the reconstructed RGB format are stored in the corresponding positions of the first pixel, the second pixel, the third pixel and the fourth pixel of the same group. In other embodiments, the pixel converting unit 12a can convert the pixels of all groups from the unreconstructed RGB format to the reconstructed RGB format, and all pixels in the reconstructed RGB format are stored in the corresponding positions of the first pixels, the second pixels, the third pixels and the fourth pixels of the groups. This disclosure is not limited. In addition, a memory unit (not shown) is provided to electrically connect with the pixel retrieving unit 11a and the pixel converting unit 12a for storing the image data before and after the conversion process. The reconstruction method will be described with reference to the following embodiments.

Figure 8A:
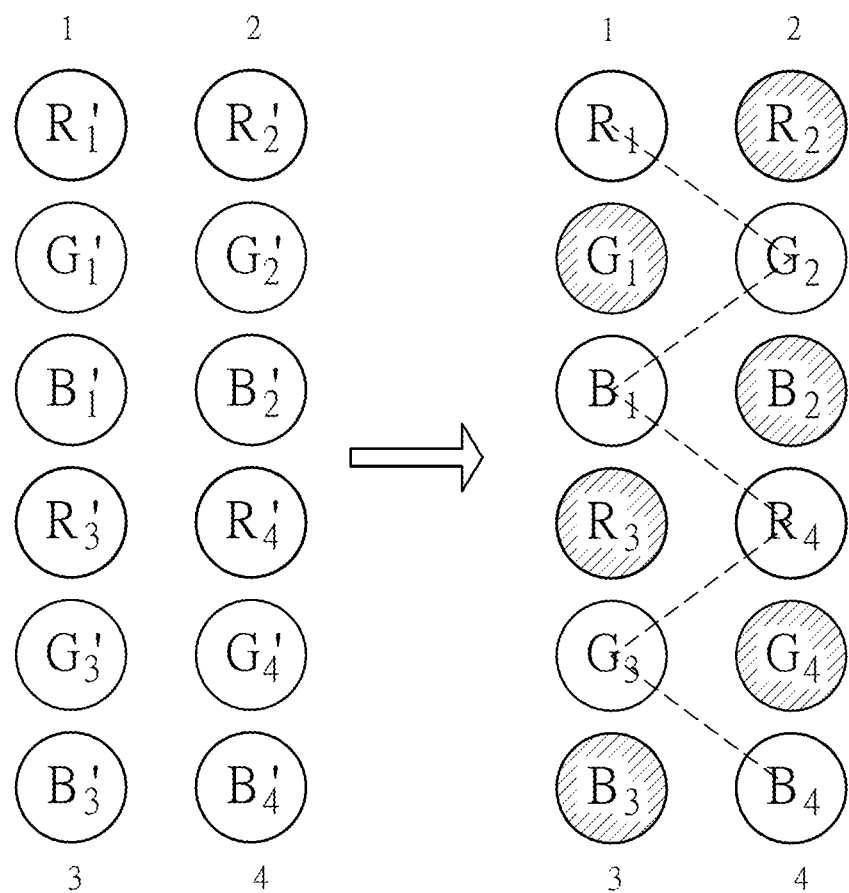
FIGS. 8A and 8B are schematic diagrams showing an image data of an embodiment, which is transformed from an unreconstructed RGB format to a reconstructed RGB format.
Figure 8B:
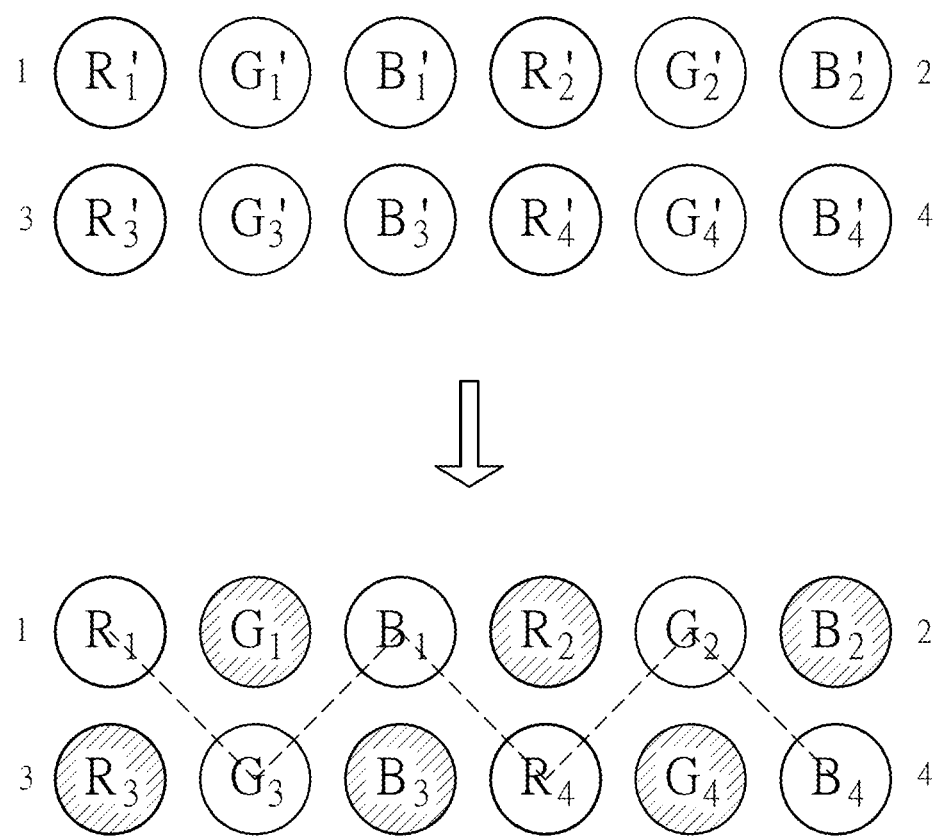

FIGS. 8A and 8B are schematic diagrams showing an image data of an embodiment, which is transformed from an unreconstructed RGB format (R', G' and B') to a reconstructed RGB format (R, G and B). In this embodiment, the R, G and B subpixels of each pixel can be arranged in vertical (as shown in FIG. 8A) or in horizontal (as shown in FIG. 8B). The image data in the reconstructed RGB format also include three subpixels arranged in vertical (as shown in FIG. 8A) or in horizontal (as shown in FIG. 8B). In some embodiments, the positions of the first to fourth pixels can be changed, and any arrangement fitting the requirement that the first pixel is located adjacent to the second and third pixels and the fourth pixel is located adjacent to the second and third pixels can be used in this disclosure.

When the coding and decoding system adopts YUV420 format, in the RGB format reconstruction method for depth frame packing and depacking of this embodiment, the pixel retrieving unit 11a obtains the R subpixel value, the G subpixel value and the B subpixel value of the first pixel of the unconstructed RGB format, the G subpixel value of the third pixel of the unconstructed RGB format, and the B subpixel value of the fourth pixel of the unconstructed RGB format. In the four pixels, as shown in FIGS. 8A and 8B, the pixel retrieving unit 11a obtains the R subpixel value, the G subpixel value and the B subpixel value of the first pixel of the unconstructed RGB format, the G subpixel value of the third pixel of the unconstructed RGB format, and the B subpixel value of the fourth pixel of the unconstructed RGB format. In other words, five subpixel values (including $R_1'$, $B_1'$, $G_1'$, $G_3'$ and $B_4'$) are obtained.

Afterwards, the pixel converting unit 12a obtains the six subpixel values having interleaved positions in the reconstructed RGB format according to the obtained R, G and B subpixel values of the first pixel of the unconstructed RGB format, the G subpixel value of the third pixel of the unconstructed RGB format, and the B subpixel value of the fourth pixel of the unconstructed RGB format ($R_1'$, $B_1'$, $G_1'$, $G_3'$ and $B_4'$). The R subpixel value of the first pixel in the reconstructed RGB format is equal to the R subpixel value of the first pixel in the unreconstructed RGB format ($R_1=R_1'$), the B subpixel value of the first pixel in the reconstructed RGB format is equal to the B subpixel value of the first pixel in the unreconstructed RGB format ($B_1=B_1'$), the G subpixel value of the second pixel in the reconstructed RGB format is equal to the G subpixel value of the first pixel in the unreconstructed RGB format ($G_2=G_1'$), the G subpixel value of the third pixel in the reconstructed RGB format is equal to the G subpixel value of the third pixel in the unreconstructed RGB format ($G_3=G_3'$), the R subpixel value of the fourth pixel in the reconstructed RGB format is equal to the G subpixel value of the first pixel in the unreconstructed RGB format ($R_4=G_1'$), and the B subpixel value of the fourth pixel in the reconstructed RGB format is equal to the B subpixel value of the fourth pixel in the unreconstructed RGB format ($B_4=B_4'$). In other words, in the YUV420 format, no matter the pixels are arranged in vertical or in horizontal, six major subpixels ($R_1$, $B_1$, $G_2$, $G_3$, $R_4$ and $B_4$) are reconstructed at first. The six major subpixels ($R_1$, $B_1$, $G_2$, $G_3$, $R_4$ and $B_4$) are utilized as the major reconstructed depth frame values in six interleaved positions.

The other six subpixels in the unreconstructed RGB format ($G_1'$, $B_2'$, $R_3'$, $B_3'$ and $G_4'$) will be discarded. The other depth frame values in the reconstructed RGB format ($G_1$, $R_2$, $B_2$, $R_3$, $B_3$ and $G_4$) will be obtained by the neighboring reconstructed depth frame values with utilizing the interpolation method. In one embodiment, the pixel converting unit 12a obtains the other six depth frame values in the reconstructed RGB format ($G_1$, $R_2$, $B_2$, $R_3$, $B_3$ and $G_4$) by the average interpolation method. In this case, the G subpixel value of the first pixel in the reconstructed RGB format is equal to an average of all neighboring subpixel values, the R subpixel value of the second pixel in the reconstructed RGB format is equal to an average of all neighboring subpixel values, the B subpixel value of the second pixel in the reconstructed RGB format is equal to an average of all neighboring subpixel values, the R subpixel value of the third pixel in the reconstructed RGB format is equal to an average of all neighboring subpixel values, the B subpixel value of the third pixel in the reconstructed RGB format is equal to an average of all neighboring subpixel values, and the G subpixel value of the fourth pixel in the reconstructed RGB format is equal to an average of all neighboring subpixel values.

Specifically, if the unknown subpixel values in the reconstructed RGB format ($G_1$, $R_2$, $B_2$, $R_3$, $B_3$ and $G_4$) are located at the edge of the image data, each of the unknown subpixel values ($G_1$, $R_2$, $B_2$, $R_3$, $B_3$ and $G_4$) are equal to the average of the subpixel values of the three neighboring major reconstructed subpixels. If the unknown subpixel values in the reconstructed RGB format are located at the inner part of the image data (not the edge), each of the unknown subpixel values are equal to the average of the subpixel values of the four neighboring major reconstructed sub pixels.

As mentioned above, in the conventional art, when the video compression coding and decoding system adopts the YUV 420 format, only three subpixel values from twelve subpixel values in four pixels can be reconstructed and recovered. That is, only the first group of $R_1$, $G_1$ and $B_1$ can be completely reconstructed and recovered. When utilizing the adjustment and reconstruction methods of this disclosure, there are six subpixel values having interleaved positions that can be completely reconstructed. Compared with the compression and decompression of the conventional video compression transmission technology, the disclosure a better RGB format conversion without directly contacting or adjusting the Y, U and V values so as to improve the distortion around the area having large (or dramatic) depth gap.

Figure 9:
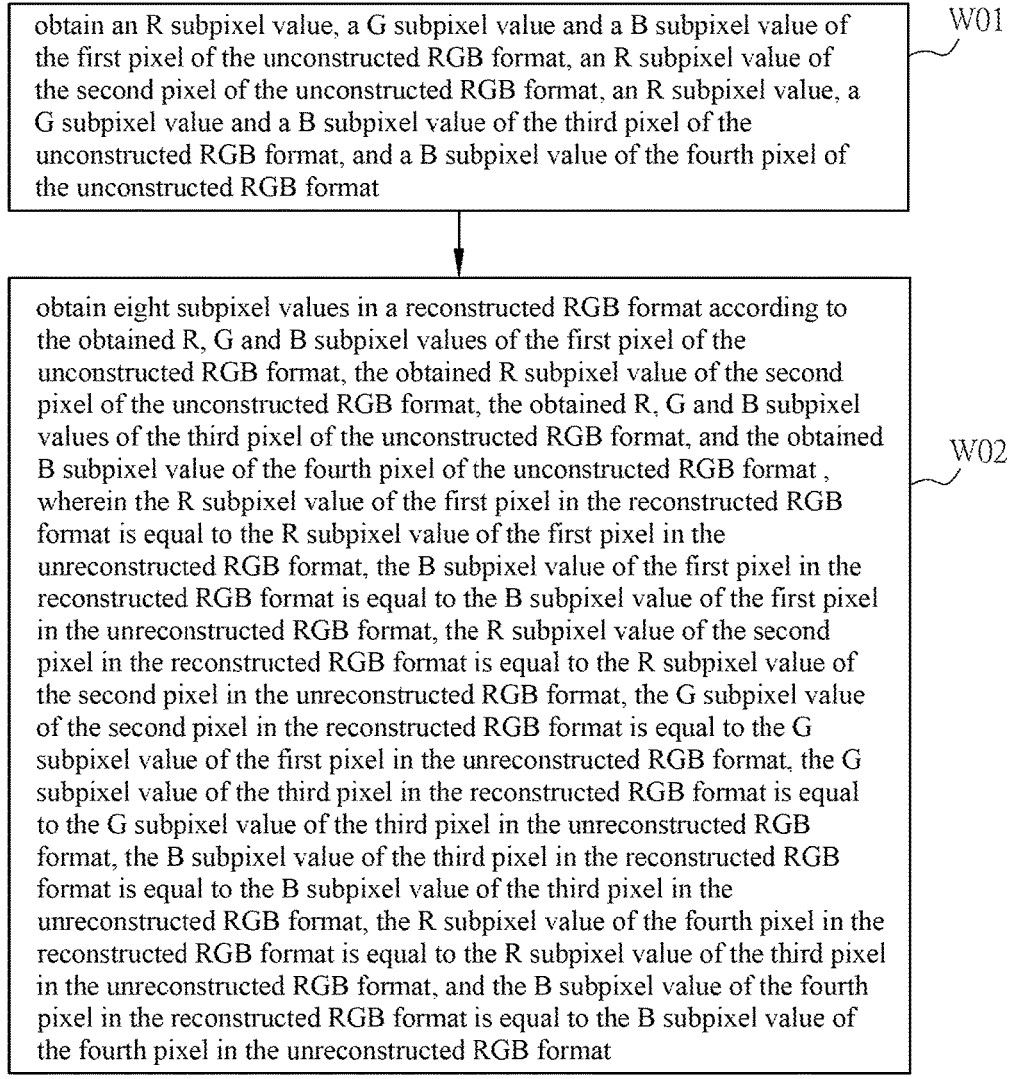

FIG. 9 is a flow chart showing another RGB format reconstruction method for depth frame packing and depacking according to the embodiment of the disclosure. In this embodiment, four pixels of each group are arranged in vertical and include a first pixel, a second pixel, a third pixel and a fourth pixel. The first pixel is arranged neighboring the second pixel and the third pixel, and the fourth pixel is arranged neighboring the second pixel and the third pixel.

As shown in FIG. 9, the RGB format reconstruction method for depth frame packing and depacking includes steps W01 to W02. The step W01 is to obtain an R subpixel value, a G subpixel value and a B subpixel value of the first pixel of the unconstructed RGB format, an R subpixel value of the second pixel of the unconstructed RGB format, an R subpixel value, a G subpixel value and a B subpixel value of the third pixel of the unconstructed RGB format, and a B subpixel value of the fourth pixel of the unconstructed RGB format. The step W02 is to obtain eight subpixel values in a reconstructed RGB format according to the obtained R, G and B subpixel values of the first pixel of the unconstructed RGB format, the obtained R subpixel value of the second pixel of the unconstructed RGB format, the obtained R, G and B subpixel values of the third pixel of the unconstructed RGB format, and the obtained B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the R subpixel value of the second pixel in the reconstructed RGB format is equal to the R subpixel value of the second pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the B subpixel value of the third pixel in the reconstructed RGB format is equal to the B subpixel value of the third pixel in the unreconstructed RGB format, the R subpixel value of the fourth pixel in the reconstructed RGB format is equal to the R subpixel value of the third pixel in the unreconstructed RGB format, and the B subpixel value of the fourth pixel in the reconstructed RGB format is equal to the B subpixel value of the fourth pixel in the unreconstructed RGB format. The reconstruction method of FIG. 9 can be applied to four pixels arranged in vertical, and the coding and decoding system is in a YUV422 format. Besides, the reconstruction method (inverse conversion method) of FIG. 9 is corresponding to the above-mentioned adjustment method (conversion method) of FIG. 5.

In addition, the pixel retrieving unit 11a obtains an R subpixel value, a G subpixel value and a B subpixel value of the first pixel of the unconstructed RGB format, an R subpixel value of the second pixel of the unconstructed RGB format, an R subpixel value, a G subpixel value and a B subpixel value of the third pixel of the unconstructed RGB format, and a B subpixel value of the fourth pixel of the unconstructed RGB format. The pixel converting unit 12a obtains eight subpixel values in a reconstructed RGB format according to the obtained R, G and B subpixel values of the first pixel of the unconstructed RGB format, the obtained R subpixel value of the second pixel of the unconstructed RGB format, the obtained R, G and B subpixel values of the third pixel of the unconstructed RGB format, and the obtained B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the R subpixel value of the second pixel in the reconstructed RGB format is equal to the R subpixel value of the second pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the B subpixel value of the third pixel in the reconstructed RGB format is equal to the B subpixel value of the third pixel in the unreconstructed RGB format, the R subpixel value of the fourth pixel in the reconstructed RGB format is equal to the R subpixel value of the third pixel in the unreconstructed RGB format, and the B subpixel value of the fourth pixel in the reconstructed RGB format is equal to the B subpixel value of the fourth pixel in the unreconstructed RGB format.

Referring to FIG. 8A, the R, G and B subpixels of each pixel are arranged in vertical, and the image data in the reconstructed RGB format also include three subpixels arranged in vertical. When the coding and decoding system adopts YUV422 format, in the RGB format reconstruction method for depth frame packing and depacking of this embodiment, the pixel retrieving unit 11a obtains the R subpixel value, the G subpixel value and the B subpixel value of the first pixel of the unconstructed RGB format, the R subpixel value of the second pixel of the unconstructed RGB format, the R subpixel value, the G subpixel value and the B subpixel value of the third pixel of the unconstructed RGB format, and the B subpixel value of the fourth pixel of the unconstructed RGB format. As shown in FIG. 8A, the pixel retrieving unit 11a obtains eight subpixel values including $R_1'$, $G_1'$, $B_1'$, $R_2'$, $R_3'$, $G_3'$, $B_3'$ and $B_4'$.

Afterwards, the pixel converting unit 12a obtains the eight subpixel values in the reconstructed RGB format according to the obtained R, G and B subpixel values of the first pixel of the unconstructed RGB format, the R subpixel value of the second pixel of the unconstructed RGB format, the obtained R, G and B subpixel values of the third pixel of the unconstructed RGB format, and the B subpixel value of the fourth pixel of the unconstructed RGB format ($R_1'$, $G_1'$, $B_1'$, $R_2'$, $R_3'$, $G_3'$, $B_3'$ and $B_4'$). The R subpixel value of the first pixel in the reconstructed RGB format is equal to the R subpixel value of the first pixel in the unreconstructed RGB format ($R_1=R_1'$), the B subpixel value of the first pixel in the reconstructed RGB format is equal to the B subpixel value of the first pixel in the unreconstructed RGB format ($B_1=B_1'$), the R subpixel value of the second pixel in the reconstructed RGB format is equal to the R subpixel value of the second pixel in the unreconstructed RGB format ($R_2=R_2'$), the G subpixel value of the second pixel in the reconstructed RGB format is equal to the G subpixel value of the first pixel in the unreconstructed RGB format ($G_2=G_1'$), the G subpixel value of the third pixel in the reconstructed RGB format is equal to the G subpixel value of the third pixel in the unreconstructed RGB format ($G_3=G_3'$), the B subpixel value of the third pixel in the reconstructed RGB format is equal to the B subpixel value of the third pixel in the unreconstructed RGB format ($B_3=B_3'$), the R subpixel value of the fourth pixel in the reconstructed RGB format is equal to the R subpixel value of the third pixel in the unreconstructed RGB format ($R_4=R_3'$), and the B subpixel value of the fourth pixel in the reconstructed RGB format is equal to the B subpixel value of the fourth pixel in the unreconstructed RGB format ($B_4=B_4'$).

In other words, when the coding and decoding system adopts the YUV422 format and the four pixels are arranged in vertical, eight major subpixel values ($R_1$, $B_1$, $R_2$, $G_2$, $G_3$, $B_3$, $R_4$ and $B_4$) are reconstructed at first. The eight major subpixel values include six major reconstructed depth frame values having interleaved positions (including $R_1$, $G_2$, $B_1$, $R_4$, $G_3$ and $B_4$) and two corner subpixel values (including $R_2$ and $B_3$) located at the right top and left bottom.

The other four subpixels in the unreconstructed RGB format ($B_2'$, $G_2'$, $R_4'$ and $G_4'$) will be discarded. The other depth frame values in the reconstructed RGB format ($G_1$, $B_2$, $R_3$ and $G_4$) will be obtained by the neighboring reconstructed depth frame values with utilizing the interpolation method. In one embodiment, the pixel converting unit 12a obtains the other four depth frame values in the reconstructed RGB format ($G_1$, $B_2$, $R_3$ and $G_4$) by the average interpolation method. In this case, the G subpixel value of the first pixel in the reconstructed RGB format is equal to an average of all neighboring subpixel values, the B subpixel value of the second pixel in the reconstructed RGB format is equal to an average of all neighboring subpixel values, the R subpixel value of the third pixel in the reconstructed RGB format is equal to an average of all neighboring subpixel values, and the G subpixel value of the fourth pixel in the reconstructed RGB format is equal to an average of all neighboring subpixel values.

Specifically, if the unknown subpixel values in the reconstructed RGB format ($G_1$, $B_2$, $R_3$ and $G_4$) are located at the edge of the image data, each of the unknown subpixel values ($G_1$, $B_2$, $R_3$ and $G_4$) are equal to the average of the subpixel values of the three neighboring major reconstructed subpixels. If the unknown subpixel values in the reconstructed RGB format are located at the inner part of the image data (not the edge), each of the unknown subpixel values are equal to the average of the subpixel values of the four neighboring major reconstructed subpixels.

FIG. 10 is a flow chart showing another RGB format reconstruction method for depth frame packing and depacking according to the embodiment of the disclosure. In this embodiment, four pixels of each group are arranged in horizontal and include a first pixel, a second pixel, a third pixel and a fourth pixel. The first pixel is arranged neighboring the second pixel and the third pixel, and the fourth pixel is arranged neighboring the second pixel and the third pixel.

As shown in FIG. 10, the RGB format reconstruction method for depth frame packing and depacking includes steps X01 to X02. The step X01 is to obtain an R subpixel value, a G subpixel value and a B subpixel value of the first pixel of the unconstructed RGB format, a B subpixel value of the second pixel of the unconstructed RGB format, an R subpixel value, a G subpixel value and a B subpixel value of the third pixel of the unconstructed RGB format, and a B subpixel value of the fourth pixel of the unconstructed RGB format. The step X02 is to obtain eight subpixel values in a reconstructed RGB format according to the obtained R, G and B subpixel values of the first pixel of the unconstructed RGB format, the obtained B subpixel value of the second pixel of the unconstructed RGB format, the obtained R, G and B subpixel values of the third pixel of the unconstructed RGB format, and the obtained B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the B subpixel value of the second pixel in the reconstructed RGB format is equal to the B subpixel value of the second pixel in the unreconstructed RGB format, the R subpixel value of the third pixel in the reconstructed RGB format is equal to the R subpixel value of the third pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the B subpixel value of the third pixel in the unreconstructed RGB format, and the B subpixel value of the fourth pixel in the reconstructed RGB format is equal to the B subpixel value of the fourth pixel in the unreconstructed RGB format. The reconstruction method of FIG. 10 can be applied to four pixels arranged in horizontal, and the coding and decoding system is in a YUV422 format. Besides, the reconstruction method (inverse conversion method) of FIG. 10 is corresponding to the above-mentioned adjustment method (conversion method) of FIG. 6.

In addition, the pixel retrieving unit 11*a* obtains an R subpixel value, a G subpixel value and a B subpixel value of the first pixel of the unconstructed RGB format, a B subpixel value of the second pixel of the unconstructed RGB format, an R subpixel value, a G subpixel value and a B subpixel value of the third pixel of the unconstructed RGB format, and a B subpixel value of the fourth pixel of the unconstructed RGB format. The pixel converting unit 12*a* obtains eight subpixel values in a reconstructed RGB format according to the obtained R, G and B subpixel values of the first pixel of the unconstructed RGB format, the obtained B subpixel value of the second pixel of the unconstructed RGB format, the obtained R, G and B subpixel values of the third pixel of the unconstructed RGB format, and the obtained B subpixel value of the fourth pixel of the unconstructed RGB format. The R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the B subpixel value of the second pixel in the reconstructed RGB format is equal to the B subpixel value of the second pixel in the unreconstructed RGB format, the R subpixel value of the third pixel in the reconstructed RGB format is equal to the R subpixel value of the third pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the B subpixel value of the third pixel in the unreconstructed RGB format, and the B subpixel value of the fourth pixel in the reconstructed RGB format is equal to the B subpixel value of the fourth pixel in the unreconstructed RGB format.

Referring to FIG. 8B, the R, G and B subpixels of each pixel are arranged in horizontal, and the image data in the reconstructed RGB format also include three subpixels arranged in horizontal. When the coding and decoding system adopts YUV422 format, in the RGB format reconstruction method for depth frame packing and depacking of this embodiment, the pixel retrieving unit 11*a* obtains the R subpixel value, the G subpixel value and the B subpixel value of the first pixel of the unconstructed RGB format, the B subpixel value of the second pixel of the unconstructed RGB format, the R subpixel value, the G subpixel value and the B subpixel value of the third pixel of the unconstructed RGB format, and the B subpixel value of the fourth pixel of the unconstructed RGB format. As shown in FIG. 8B, the pixel retrieving unit 11*a* obtains eight subpixel values including $R_1'$, $G_1'$, $B_1'$, $B_2'$, $R_3'$, $G_3'$, $B_3'$ and $B_4'$.

Afterwards, the pixel converting unit 12*a* obtains the eight subpixel values in the reconstructed RGB format according to the obtained R, G and B subpixel values of the first pixel of the unconstructed RGB format, the B subpixel value of the second pixel of the unconstructed RGB format, the obtained R, G and B subpixel values of the third pixel of the unconstructed RGB format, and the B subpixel value of the fourth pixel of the unconstructed RGB format ($R_1'$, $G_1'$, $B_1'$, $B_2'$, $R_3'$, $G_3'$, $B_3'$ and $B_4'$). The R subpixel value of the first pixel in the reconstructed RGB format is equal to the R subpixel value of the first pixel in the unreconstructed RGB format ($R_1=R_1'$), the B subpixel value of the first pixel in the reconstructed RGB format is equal to the B subpixel value of the first pixel in the unreconstructed RGB format ($B_1=B_1'$), the G subpixel value of the second pixel in the reconstructed RGB format is equal to the G subpixel value of the first pixel in the unreconstructed RGB format ($G_2=G_1'$), the B subpixel value of the second pixel in the reconstructed RGB format is equal to the B subpixel value of the second pixel in the unreconstructed RGB format ($B_2=B_2'$), the R subpixel value of the third pixel in the reconstructed RGB format is equal to the R subpixel value of the third pixel in the unreconstructed RGB format ($R_3=R_3'$), the G subpixel value of the third pixel in the reconstructed RGB format is equal to the G subpixel value of the third pixel in the unreconstructed RGB format ($G_3=G_3'$), the R subpixel value of the fourth pixel in the reconstructed RGB format is equal to the B subpixel value of the third pixel in the unreconstructed RGB format ($R_4=B_3'$), and the B subpixel value of the fourth pixel in the reconstructed RGB format is equal to the B subpixel value of the fourth pixel in the unreconstructed RGB format ($B_4=B_4'$). In other words, when the coding and decoding system adopts the YUV422 format and the four pixels are arranged in horizontal, eight major subpixel values ($R_1$, $B_1$, $G_2$, $B_2$, $R_3$, $G_3$, $R_4$ and $B_4$) are reconstructed at first. The eight major subpixel values include six major reconstructed depth frame values having interleaved positions (including $R_1$, $G_3$, $B_1$, $R_4$, $G_2$ and $B_4$) and two corner subpixel values (including $R_3$ and $B_2$) located at the right top and left bottom.

The other four subpixels in the unreconstructed RGB format ($R_2'$, $G_2'$, $R_4'$ and $G_4'$) will be discarded. The other depth frame values in the reconstructed RGB format ($G_1$, $R_2$, $B_3$ and $G_4$) will be obtained by the neighboring reconstructed depth frame values with utilizing the interpolation method. In one embodiment, the pixel converting unit 12*a* obtains the other four depth frame values in the reconstructed RGB format ($G_1$, $R_2$, $B_3$ and $G_4$) by the average interpolation method. In this case, the G subpixel value of the first pixel in the reconstructed RGB format is equal to an average of all neighboring subpixel values, the R subpixel value of the second pixel in the reconstructed RGB format is equal to an average of all neighboring subpixel values, the B subpixel value of the third pixel in the reconstructed RGB format is equal to an average of all neighboring subpixel values, and the G subpixel value of the fourth pixel in the reconstructed RGB format is equal to an average of all neighboring subpixel values.

Specifically, if the unknown subpixel values in the reconstructed RGB format ($G_1$, $R_2$, $B_3$ and $G_4$) are located at the edge of the image data, each of the unknown subpixel values ($G_1$, $R_2$, $B_3$ and $G_4$) are equal to the average of the subpixel values of the three neighboring major reconstructed subpixels. If the unknown subpixel values in the reconstructed RGB format are located at the inner part of the image data (not the edge), each of the unknown subpixel values are equal to the average of the subpixel values of the four neighboring major reconstructed subpixels.

As mentioned above, in the conventional art, when the video compression coding and decoding system adopts the YUV 422 format, only six subpixel values from twelve subpixel values in four pixels can be reconstructed and recovered. That is, only the first group of $R_1$, $G_1$ and $B_1$ and the third group of $R_3$, $G_3$ and $B_3$ can be completely reconstructed and recovered. When utilizing the adjustment and reconstruction methods of this disclosure, there are eight subpixel values ($R_1$, $B_1$, $R_2$, $G_2$, $G_3$, $B_3$, $R_4$ and $B_4$, or $R_1$, $B_1$, $G_2$, $B_2$, $R_3$, $G_3$, $R_4$ and $B_4$) that can be completely reconstructed. Compared with the compression and decompression of the conventional video compression transmission technology, the disclosure a better RGB format conversion without directly contacting or adjusting the Y, U and V values so as to improve the distortion around the area having large (or dramatic) depth gap.

As mentioned above, in the RGB format adjustment and reconstruction method and circuit for depth frame packing and depacking of this disclosure, the procedures of the conversion from RGB format to YUV format and the revised conversion from YUV format to RGB format in the conventional video compression system are not changed. Moreover, in the RGB format adjustment and reconstruction method and circuit for depth frame packing and depacking of this disclosure, a better RGB conversion can be obtained without directly contacting or adjusting YUV values so as to recover a better original depth pixel values, thereby improving the distortion around the area having large (or dramatic) depth gap.

Although the disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the disclosure.

What is claimed is:

1. An RGB format adjustment method for depth frame packing and depacking, wherein an RGB format comprises an R subpixel, a G subpixel and a B subpixel, the depth frame in an unadjusted RGB format at least comprises four pixels, R subpixels, G subpixels and B subpixels of the four pixels are arranged in vertical or in horizontal, the four pixels comprise a first pixel, a second pixel, a third pixel and a fourth pixel, the first pixel is arranged neighboring the second pixel and the third pixel, and the fourth pixel is arranged neighboring the second pixel and the third pixel, the method comprising:

obtaining, by a pixel retrieving unit, two R subpixel values, two G subpixel values and two B subpixel values having interleaved positions from the four pixels in the unadjusted RGB format;

obtaining, by a pixel converting unit, an R subpixel value, a G subpixel value and a B subpixel value of the first pixel in an adjusted RGB format according to the obtained R, G and B subpixel values, wherein the R subpixel value of the first pixel in the adjusted RGB format is equal to an R subpixel value of the first pixel in the unadjusted RGB format, the G subpixel value of the first pixel in the adjusted RGB format is equal to an R subpixel value of the fourth pixel in the unadjusted RGB format, and the B subpixel value of the first pixel in the adjusted RGB format is equal to a B subpixel value of the first pixel in the unadjusted RGB format; and obtaining, by the pixel converting unit, R subpixel values, G subpixel values and B subpixel values of the second pixel in the adjusted RGB format, the third pixel in the adjusted RGB format and the fourth pixel in the adjusted RGB format according to the obtained R, G and B subpixel values and the obtained R, G and B subpixel values of the first pixel in the adjusted RGB format; and storing, by a memory unit, the obtained RGB subpixel values of the first to fourth pixels in the adjusted RGB format.

2. The method according to claim 1, wherein, in the four pixels in the adjusted RGB format, all subpixel values of the second pixel are equal to each other, and each of the subpixel values of the second pixel satisfies an equation of:

$$R_2'=G_2'=B_2'=G_2+0.2990\times R_1'-0.4130\times G_1'+0.1140\times B_1',$$

wherein, $R_2'$, $G_2'$ and $B_2'$ are respectively an R subpixel value, a G subpixel value and a B subpixel value of the second pixel in the adjusted RGB format, $R_1'$, $G_1'$ and $B_1'$ are respectively an R subpixel value, a G subpixel value and a B subpixel value of the first pixel in the adjusted RGB format, and $G_2$ is a G subpixel value of the second pixel in the unadjusted RGB format.

3. The method according to claim 1, wherein wherein, in the four pixels in the adjusted RGB format, all subpixel values of the third pixel are equal to each other, and each of the subpixel values of the third pixel satisfies an equation of:

$$R_3'=G_3'=B_3'=G_3+0.2990\times R_1'-0.4130\times G_1'+0.1140\times B_1',$$

wherein, $R_3'$, $G_3'$ and $B_3'$ are respectively an R subpixel value, a G subpixel value and a B subpixel value of the third pixel in the adjusted RGB format, $R_1'$, $G_1'$ and $B_1'$ are respectively an R subpixel value, a G subpixel value and a B subpixel value of the first pixel in the adjusted RGB format, and $G_3$ is a G subpixel value of the third pixel in the unadjusted RGB format.

4. The method according to claim 1, wherein wherein, in the four pixels in the adjusted RGB format, all subpixel values of the fourth pixel are equal to each other, and each of the subpixel values of the fourth pixel satisfies an equation of:

$$R_4'=G_4'=B_4'=B_4+0.2990\times R_1'+0.5870\times G_1'-0.8860\times B_1',$$

wherein, $R_4'$, $G_4'$ and $B_4'$ are respectively an R subpixel value, a G subpixel value and a B subpixel value of the fourth pixel in the adjusted RGB format, $R_1'$, $G_1'$ and $B_1'$ are respectively an R subpixel value, a G subpixel value and a B subpixel value of the first pixel in the adjusted RGB format, and $B_4$ is a B subpixel value of the fourth pixel in the unadjusted RGB format.

5. A circuit applied to perform the RGB format adjustment method for the depth frame packing and depacking according to claim 1, the circuit comprising:

a pixel retrieving unit obtaining two R subpixel values, two G subpixel values and two B subpixel values having interleaved positions from the four pixels in the unadjusted RGB format; and a pixel converting unit obtaining the R subpixel value, the G subpixel value and the B subpixel value of the first pixel in the adjusted RGB format according to the two R subpixel values, the two G subpixel values, and the two B subpixel values obtained by the pixel retrieving unit;

wherein the R subpixel value of the first pixel in the adjusted RGB format is equal to the R subpixel value of the first pixel in the unadjusted RGB format, the G subpixel value of the first pixel in the adjusted RGB format is equal to the R subpixel value of the fourth pixel in the unadjusted RGB format, the B subpixel value of the first pixel in the adjusted RGB format is equal to the B subpixel value of the first pixel in the unadjusted RGB format, the pixel converting unit further obtains the R subpixel values, the G subpixel values and the B subpixel values of the second pixel in the adjusted RGB format, the third pixel in the adjusted RGB format and the fourth pixel in the adjusted RGB format according to the two R subpixel values, the two G subpixel values and the two B subpixel values obtained by the pixel retrieving unit, and the obtained R, G and B subpixel values of the first pixel in the adjusted RGB format.

6. The circuit according to claim 5, wherein, in the four pixels in the adjusted RGB format, all subpixel values of the second pixel are equal to each other, and each of the subpixel values of the second pixel satisfies an equation of:

$$R_2'=G_2'=B_2'=G_2+0.2990 \times R_1'-0.4130 \times G_1'+0.1140 \times B_1',$$

wherein, $R_2'$, $G_2'$ and $B_2'$ are respectively an R subpixel value, a G subpixel value and a B subpixel value of the second pixel in the adjusted RGB format, $R_1'$, $G_1'$ and $B_1'$ are respectively an R subpixel value, a G subpixel value and a B subpixel value of the first pixel in the adjusted RGB format, and $G_2$ is a G subpixel value of the second pixel in the unadjusted RGB format.

7. The circuit according to claim 5, wherein wherein, in the four pixels in the adjusted RGB format, all subpixel values of the third pixel are equal to each other, and each of the subpixel values of the third pixel satisfies an equation of:

$$R_3'=G_3'=B_3'=G_3+0.2990 \times R_1'-0.4130 \times G_1'+0.1140 \times B_1',$$

wherein, $R_3'$, $G_3'$ and $B_3'$ are respectively an R subpixel value, a G subpixel value and a B subpixel value of the third pixel in the adjusted RGB format, $R_1'$, $G_1'$ and $B_1'$ are respectively an R subpixel value, a G subpixel value and a B subpixel value of the first pixel in the adjusted RGB format, and $G_3$ is a G subpixel value of the third pixel in the unadjusted RGB format.

8. The circuit according to claim 5, wherein wherein, in the four pixels in the adjusted RGB format, all subpixel values of the fourth pixel are equal to each other, and each of the subpixel values of the fourth pixel satisfies an equation of:

$$R_4'=G_4'=B_4'=B_4+0.2990 \times R_1'+0.5870 \times G_1'-0.8860 \times B_1',$$

wherein, $R_4'$, $G_4'$ and $B_4'$ are respectively an R subpixel value, a G subpixel value and a B subpixel value of the fourth pixel in the adjusted RGB format, $R_1'$, $G_1'$ and $B_1'$ are respectively an R subpixel value, a G subpixel value and a B subpixel value of the first pixel in the adjusted RGB format, and $B_4$ is a B subpixel value of the fourth pixel in the unadjusted RGB format.

9. An RGB format reconstruction method for depth frame packing and depacking, wherein an RGB format comprises an R subpixel, a G subpixel and a B subpixel, the depth frame in an unreconstructed RGB format at least comprises four pixels, R subpixels, G subpixels and B subpixels of the four pixels are arranged in vertical or in horizontal, the four pixels comprise a first pixel, a second pixel, a third pixel and a fourth pixel, the first pixel is arranged neighboring the second pixel and the third pixel, and the fourth pixel is arranged neighboring the second pixel and the third pixel, the method comprising:

obtaining, by a pixel retrieving unit, an R subpixel value, a G subpixel value and a B subpixel value of the first pixel of the unconstructed RGB format, a G subpixel value of the third pixel of the unconstructed RGB format, and a B subpixel value of the fourth pixel of the unconstructed RGB format; and obtaining, by a pixel converting unit, six subpixel values having interleaved positions in a reconstructed RGB format according to the obtained R, G and B subpixel values of the first pixel of the unconstructed RGB format, the G subpixel value of the third pixel of the unconstructed RGB format, and the B subpixel value of the fourth pixel of the unconstructed RGB format, wherein the R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the G subpixel value of the first pixel in the unreconstructed RGB format, and the B subpixel value of the fourth pixel in the reconstructed RGB format is equal to the B subpixel value of the fourth pixel in the unreconstructed RGB format; and storing, by a memory unit, the obtained RGB subpixel values of the first to fourth pixels in the reconstructed RGB format.

10. The method according to claim 9, wherein the G subpixel value of the first pixel in the reconstructed RGB format is equal to an average subpixel value of all subpixels neighboring the G subpixel, the R subpixel value of the second pixel in the reconstructed RGB format is equal to an average subpixel value of all subpixels neighboring the R subpixel, the B subpixel value of the second pixel in the reconstructed RGB format is equal to an average subpixel value of all subpixels neighboring the B subpixel, the R subpixel value of the third pixel in the reconstructed RGB format is equal to an average subpixel value of all subpixels neighboring the R subpixel, the B subpixel value of the third pixel in the reconstructed RGB format is equal to an average subpixel value of all subpixels neighboring the B subpixel, and the G subpixel value of the fourth pixel in the reconstructed RGB format is equal to an average subpixel value of all subpixels neighboring the G subpixel.

11. A circuit applied to perform the RGB format reconstruction method for the depth frame packing and depacking according to claim 9, the circuit comprising:

a pixel retrieving unit obtaining the R subpixel value, the G subpixel value and the B subpixel value of the first pixel of the unconstructed RGB format, the G subpixel value of the third pixel of the unconstructed RGB format, and the B subpixel value of the fourth pixel of the unconstructed RGB format; and a pixel converting unit obtaining the six subpixel values having interleaved positions in the reconstructed RGB format according to the obtained R, G and B subpixel values of the first pixel of the unconstructed RGB format, the G subpixel value of the third pixel of the unconstructed RGB format, and the B subpixel value of the fourth pixel of the unconstructed RGB format;

wherein the R subpixel value of the first pixel in the reconstructed RGB format is equal to the R subpixel value of the first pixel in the unreconstructed RGB format, the B subpixel value of the first pixel in the reconstructed RGB format is equal to the B subpixel value of the first pixel in the unreconstructed RGB format, the G subpixel value of the second pixel in the reconstructed RGB format is equal to the G subpixel value of the first pixel in the unreconstructed RGB format, the G subpixel value of the third pixel in the reconstructed RGB format is equal to the G subpixel value of the third pixel in the unreconstructed RGB format, the R subpixel value of the fourth pixel in the reconstructed RGB format is equal to the G subpixel value of the first pixel in the unreconstructed RGB format, and the B subpixel value of the fourth pixel in the reconstructed RGB format is equal to the B subpixel value of the fourth pixel in the unreconstructed RGB format.

12. The circuit according to claim 11, wherein the G subpixel value of the first pixel in the reconstructed RGB format is equal to an average subpixel value of all subpixels neighboring the G subpixel, the R subpixel value of the second pixel in the reconstructed RGB format is equal to an average subpixel value of all subpixels neighboring the R subpixel, the B subpixel value of the second pixel in the reconstructed RGB format is equal to an average subpixel value of all subpixels neighboring the B subpixel, the R subpixel value of the third pixel in the reconstructed RGB format is equal to an average subpixel value of all subpixels neighboring the R subpixel, the B subpixel value of the third pixel in the reconstructed RGB format is equal to an average subpixel value of all subpixels neighboring the B subpixel, and the G subpixel value of the fourth pixel in the reconstructed RGB format is equal to an average subpixel value of all subpixels neighboring the G subpixel.

* * * * *